(12) United States Patent
Shaga

(10) Patent No.: US 11,656,101 B2
(45) Date of Patent: May 23, 2023

(54) REDUNDANT ANGULAR POSITION SENSOR AND ASSOCIATED METHOD OF USE

(71) Applicant: Microchip Technology Inc., Chandler, AZ (US)

(72) Inventor: Ganesh Shaga, Warangal (IN)

(73) Assignee: Microchip Technology, Inc., Chandler, AZ (US)

( * ) Notice: Subject to any disclaimer, the term of this patent is extended or adjusted under 35 U.S.C. 154(b) by 286 days.

(21) Appl. No.: 17/146,875

(22) Filed: Jan. 12, 2021

(65) Prior Publication Data

US 2022/0136869 A1    May 5, 2022

Related U.S. Application Data

(60) Provisional application No. 63/110,307, filed on Nov. 5, 2020.

(51) Int. Cl.
*G01D 5/20* (2006.01)
*G01B 7/30* (2006.01)

(52) U.S. Cl.
CPC ............. *G01D 5/2073* (2013.01); *G01B 7/30* (2013.01)

(58) Field of Classification Search
CPC ................................ G01D 5/2073; G01B 7/30
See application file for complete search history.

(56) References Cited

U.S. PATENT DOCUMENTS

| | | |
|---|---|---|
| 4,737,698 A | 4/1988 | McMullin et al. |
| 6,255,810 B1 * | 7/2001 | Irie .......................... G01D 3/08 324/207.17 |
| 8,947,077 B2 | 2/2015 | Lee et al. |
| 9,528,858 B2 | 12/2016 | Bertin |
| 10,444,037 B2 | 10/2019 | Bertin |
| 10,760,928 B1 | 9/2020 | Shaga et al. |
| 2007/0001666 A1 | 1/2007 | Lee |

(Continued)

FOREIGN PATENT DOCUMENTS

| | | |
|---|---|---|
| CN | 104864804 B | 5/2017 |
| CN | 206146372 U | 5/2017 |

(Continued)

OTHER PUBLICATIONS

PCT/US2021/013288, International Search Report and Written Opinion, European Patent Office, dated Jun. 7, 2021.

*Primary Examiner* — Walter L Lindsay, Jr.
*Assistant Examiner* — Milton Gonzalez
(74) *Attorney, Agent, or Firm* — Glass and Associates; Molly Sauter; Kenneth Glass

(57) ABSTRACT

A redundant angular position sensor comprising a first angular position sensor including a first excitation coil, a first sensing coil and a second sensing coil and a second angular position sensor. The second angular position sensor including a second excitation coil, a third sensing coil and a fourth sensing coil. Each of the first, second, third and fourth sensing coils comprising a respective clockwise winding portion and a respective counter-clockwise winding portion. The redundant angular position sensor further comprises a rotatable inductive coupling element positioned in overlying relation to the sensing coils and separated from the sensing coils by a gap, wherein the rotatable inductive coupling element comprises four, substantially evenly radially spaced, sector apertures.

20 Claims, 21 Drawing Sheets

(56) References Cited

U.S. PATENT DOCUMENTS

| | | |
|---|---|---|
| 2008/0054887 A1 | 3/2008 | Lee |
| 2019/0017845 A1* | 1/2019 | Utermoehlen ....... G01D 5/2053 |
| 2019/0186891 A1 | 6/2019 | Utermoehlen et al. |
| 2019/0242726 A1 | 8/2019 | Utermoehlen et al. |
| 2020/0072643 A1* | 3/2020 | Qama ................. G01D 5/2053 |
| 2021/0255657 A1* | 8/2021 | Miller ..................... G01D 3/08 |

FOREIGN PATENT DOCUMENTS

| | | |
|---|---|---|
| CN | 109115094 B | 2/2021 |
| DE | 102015220615 A1 | 4/2017 |
| EP | 2145158 B1 | 3/2018 |
| EP | 3657132 A1 | 6/2021 |
| GB | 2394293 A | 4/2004 |
| WO | 2017015447 A1 | 1/2017 |

* cited by examiner

700 ⟶

┌─────────────────────────────────────────────────────────────┐
│ ESTABLISHING A MAGNETIC COUPLING BETWEEN A FIRST EXCITATION COIL, A FIRST SENSING COIL AND A SECOND SENSING COIL OF A FIRST ANGULAR POSITION SENSOR TO INDUCE A TIME VARYING VOLTAGE IN THE FIRST SENSING COIL, WHEREIN EACH OF THE FIRST SENSING COIL AND THE SECOND SENSING COIL COMPRISES A RESPECTIVE CLOCKWISE WINDING PORTION AND A RESPECTIVE COUNTER-CLOCKWISE WINDING PORTION (OPT. WHEREIN THE FIRST EXCITATION COIL FORMS A FIRST SEMICIRCULAR AREA DEFINING A FIRST INTERIOR AREA AND THE FIRST SENSING COIL AND THE SECOND SENSING COIL ARE POSITIONED WITHIN THE FIRST INTERIOR AREA) │ ~ 705
└─────────────────────────────────────────────────────────────┘
                                    ↓
┌─────────────────────────────────────────────────────────────┐
│ ESTABLISHING A MAGNETIC COUPLING BETWEEN A SECOND EXCITATION COIL AND A THIRD SENSING COIL AND A FOURTH SENSING COIL OF A SECOND ANGULAR POSITION SENSOR TO INDUCE A TIME VARYING VOLTAGE IN THE THIRD SENSING COIL AND THE FOURTH SENSING COIL, WHEREIN EACH OF THE THIRD SENSING COIL AND THE FOURTH SENSING COIL COMPRISES A RESPECTIVE CLOCKWISE WINDING PORTION AND A RESPECTIVE COUNTER-CLOCKWISE WINDING PORTION, AND WHEREIN A DIAMETER OF THE SECOND SEMICIRCULAR EXCITATION COIL IS POSITIONED ADJACENT TO A DIAMETER OF THE FIRST SEMICIRCULAR EXCITATION COIL (OPT. WHEREIN THE SECOND EXCITATION COIL FORMS A SECOND SEMICIRCULAR AREA DEFINING A SECOND INTERIOR AREA AND THE THIRD SENSING COIL AND THE FOURTH SENSING COIL ARE POSITIONED WITHIN THE SECOND INTERIOR AREA) │ ~ 710
└─────────────────────────────────────────────────────────────┘
                                    ↓
┌─────────────────────────────────────────────────────────────┐
│ ROTATING THE ROTATABLE INDUCTIVE COUPLING ELEMENT TO GENERATE COARSE RESOLUTION SINE AND COSINE SIGNALS HAVING A NUMBER OF CYCLES PER ROTATION OF THE ROTATABLE INDUCTIVE COUPLING ELEMENT EQUAL TO A NUMBER OF CONDUCTIVE SECTORS OF THE FIRST ANNULAR PORTION OF THE ROTATABLE INDUCTIVE COUPLING ELEMENT AND TO GENERATE FINE RESOLUTION SINE AND COSINE SIGNALS HAVING A NUMBER OF CYCLES PER ROTATION OF THE ROTATABLE INDUCTIVE COUPLING ELEMENT EQUAL TO A NUMBER OF CONDUCTIVE SECTORS OF THE SECOND ANNULAR PORTION OF THE ROTATABLE INDUCTIVE COUPLING ELEMENT │ ~ 715
└─────────────────────────────────────────────────────────────┘
                                    ↓
┌─────────────────────────────────────────────────────────────┐
│ MEASURING A TIME VARYING VOLTAGE INDUCED IN THE FIRST SENSING COIL AND THE SECOND SENSING COIL AS A RESULT OF THE VARIATION IN THE MAGNETIC COUPLING AND DETERMINING AN ANGULAR POSITION OF THE ROTATABLE INDUCTIVE COUPLING ELEMENT RELATIVE TO THE POSITION OF THE FIRST SENSING COIL AND THE SECOND SENSING COIL │ ~ 720
└─────────────────────────────────────────────────────────────┘
                                    ↓
┌─────────────────────────────────────────────────────────────┐
│ MEASURING A TIME VARYING VOLTAGE INDUCED IN THE THIRD SENSING COIL AND THE FOURTH SENSING COIL AS A RESULT OF THE VARIATION IN THE MAGNETIC COUPLING AND DETERMINING AN ANGULAR POSITION OF THE ROTATABLE INDUCTIVE COUPLING ELEMENT RELATIVE TO THE POSITION OF THE THIRD SENSING COIL AND THE FOURTH SENSING COIL │ ~ 725
└─────────────────────────────────────────────────────────────┘

*FIG. 7*

REDUNDANT ANGULAR POSITION SENSOR AND ASSOCIATED METHOD OF USE

CROSS-REFERENCE TO RELATED APPLICATIONS

This application claims priority to U.S. Provisional Patent Application No. 63/110,307 filed on Nov. 5, 2020, which is incorporated by reference in its entirety.

BACKGROUND OF THE INVENTION

Numerous industries, including the automotive, industrial and aerospace industries, place stringent reliability requirements on their position sensing systems. Potentiometers are commonly known in the art for use in position sensing systems and are specifically used for determining displacement angles of motor controlled or regulated elements. Although potentiometers are a relatively inexpensive solution for position sensing, they are also susceptible to the effects of adverse environmental conditions and are subject to failure resulting from numerous operations, over time. To overcome the disadvantages of potentiometer-based sensing systems, non-contact position sensors are increasingly being used to meet the stringent reliability requirements. Non-contact position sensors are currently known in the art and may be based on various principles, including inductive, capacitive, Hall effect or magneto-resistive principles.

A non-contact sensor based on inductive principles in commonly known as an inductive position sensor, or a resolver. An inductive position sensor comprises a coil assembly having one or more excitation coils and two or more sensing coils. In the operation of an inductive position sensor, an alternating current (AC) is injected into the excitation coil(s) which results in the generation of a time varying magnetic field in the vicinity of the excitation coil(s). The time varying magnetic field is sufficient to induce a time varying voltage in the sensing coils as a result of the mutual magnetic coupling between the excitation coil and the sensing coils. To determine an angular position of a rotatable target with respect to the coil assembly, a conductive target is rotatably positioned within the time varying magnetic field between the excitation coil and the sensing coils and separated from the coils by an airgap. The presence of the rotatable target within the time varying magnetic field changes the mutual magnetic coupling between the excitation coil and the sensing coils, relative to the position of the rotatable target. The change in mutual coupling between the excitation coil and the sensing coils alters the time varying voltage induced in the sensing coils. Since the magnitude of the voltage change induced in the sensing coils is generally sinusoidal with respect to the angular position of the rotatable target relative to the coil assembly, the time varying voltage within the sensing coils can be measured and the angular position of the rotatable target can be calculated from the measurements.

It is known in the art to form planar coils on one or more printed circuit boards (PCB) to provide the coil assembly of the position sensor. There is increased demand for position sensors that are light weight, low cost, highly reliable and that exhibit improved noise immunity. While known inductive position sensors meet many of these requirements, various safety critical applications also require sensor redundancy. For example, in the automotive industry, brake pedals, gas pedals and engine throttle mechanisms require redundant sensor solutions, so that if one of the sensors fails, the redundant sensor will continue to operate correctly.

Accordingly, what is needed in the art is a non-contact angular position sensor that meets sensing accuracy and redundancy requirements.

SUMMARY OF THE INVENTION

In various embodiments, the present invention provides a system and method for sensing an angular position of a rotatable inductive coupling element, employing redundancy. The system and method of the present invention provide an improved, non-contact, inductive, angular position sensor which provides for redundancy while still meeting sensing accuracy requirements in a reduced form factor.

In a particular embodiment, the present invention provides a redundant angular position sensor comprising a first angular position sensor and a second angular position sensor, wherein the first angular position sensor is positioned adjacent to the second angular position sensor. The first angular position sensor includes, a first excitation coil, a first sensing coil and a second sensing coil, each of the first and second sensing coils comprising a respective clockwise winding portion and a respective counter-clockwise winding portion. The second angular position sensor includes a second excitation coil, a third sensing coil and a fourth sensing coil, each of the third and fourth sensing coils comprising a respective clockwise winding portion and a respective counter-clockwise winding portion. The redundant angular position sensor further includes a rotatable inductive coupling element positioned in overlying relation to, and separated by a gap from, the first sensing coil, the second sensing coil, the third sensing coil and the fourth sensing coil, wherein the rotatable inductive coupling element comprises four sector apertures that are substantially evenly radially spaced about the rotatable inductive coupling element.

In a specific embodiment, the first excitation coil forms a first semicircular area defining a first interior area and the first sensing coil and the second sensing coil are positioned within the first interior area and the second excitation coil forms a second semicircular area defining a second interior area and the third sensing coil and the fourth sensing coil are positioned within the second interior area.

Additionally, the first angular position sensor further comprises a first voltage supply and a first ground node and the second angular position sensor further comprises a second voltage supply, that is independent of the first voltage supply, and a second ground node that is independent of the first ground node.

In another embodiment, the present invention provides a method for redundantly sensing an angular position of a rotatable inductive coupling element. The method includes, establishing a magnetic coupling between a first excitation coil, a first sensing coil and a second sensing coil of a first angular position sensor to induce a time varying voltage in the first sensing coil and the second sensing coil, wherein each of the first sensing coil and the second sensing coil comprises a respective clockwise winding portion and a respective counter-clockwise winding portion, and establishing a magnetic coupling between a second excitation coil and a third sensing coil and a fourth sensing coil of a second angular position sensor to induce a time varying voltage in the third sensing coil and the fourth sensing coil, wherein each of the third sensing coil and the fourth sensing coil comprises a respective clockwise winding portion and a respective counter-clockwise winding portion. The method further includes, rotating a rotatable inductive coupling element comprising four sector apertures that are substantially evenly radially spaced about the rotatable inductive coupling element, the rotatable inductive coupling element in overlying relation to the first sensing coil, the second sensing coil, the third sensing coil and the fourth sensing coil and separated from the first sensing coil, the second sensing coil, the third sensing coil and the fourth sensing coil by a gap, the rotational position of the sector apertures of the rotatable inductive coupling element to cause a variation in the magnetic coupling between the first excitation coil, the first sensing coil and the second sensing coil and to cause a variation in the magnetic coupling between the second excitation coil, the third sensing coil and the fourth sensing coil responsive to rotation of the rotatable inductive coupling element. The method additionally includes, measuring a time varying voltage induced in the first sensing coil and the second sensing coil as a result of the variation in the magnetic coupling, determining an angular position of the rotatable inductive coupling element relative to the position of the first sensing coil and the second sensing coil, measuring a time varying voltage induced in the third sensing coil and the fourth sensing coil as a result of the variation in the magnetic coupling and determining an angular position of the rotatable inductive coupling element relative to the position of the third sensing coil and the fourth sensing coil.

As such, in various embodiments, the present invention provides a redundant angular position sensor and a method for redundantly sensing an angular position of a rotatable inductive coupling element.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 7 is a flow diagram illustrating a method for redundantly sensing an angular position of a rotatable inductive coupling element, in accordance with an embodiment of the present invention.

DETAILED DESCRIPTION OF THE INVENTION

Figure 1:
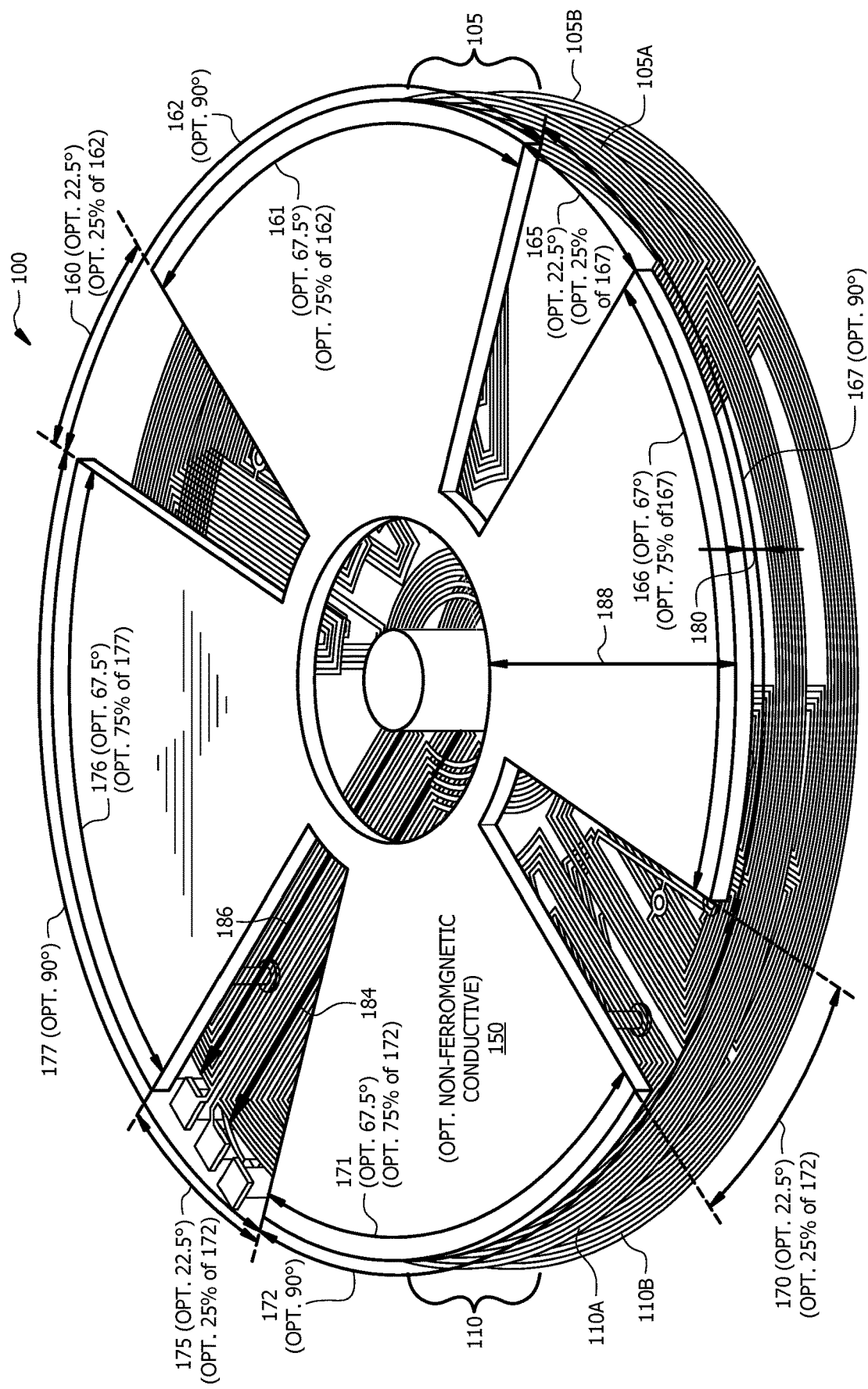
FIG. 1 illustrates a redundant angular position sensor comprising a first angular position sensor and a second angular position sensor, in accordance with an embodiment of the present invention.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims.

Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various embodiments, the present invention provides a redundant angular position sensor comprising a first angular position sensor and a second angular position sensor that is independent of the first angular position sensor, wherein the voltage supply and ground node of the first angular position sensor are independent of the voltage supply and ground node of the second angular position sensor. By incorporating two independent angular position sensors in the redundant angular position sensor of the present invention, redundancy is provided. Additionally, the first angular position sensor and the second angular position sensor of the redundant angular position sensor are implemented on a two-layer printed circuit board (PCB), thereby providing a cost-effective solution. In general, the first angular position sensor comprises a first excitation coil and two sensing coils positioned within an area defined by an outer perimeter of either the excitation coil or the two sensing coils and the second angular position sensor comprises a second excitation coil and two sensing coils positioned within an area defined by an outer perimeter of either the second excitation coil or the two sensing coils. In one embodiment, positioning the coil patterns of the sensing coils within an interior area formed by each of the respective excitation coils provides redundancy in a reduced form factor.

With reference to FIG. 1, redundant angular position sensor 100 of the present invention includes a first angular position sensor having a first excitation coil 105 including a counter-clockwise winding portion 105A and a clockwise winding portion 105B and a second angular position sensor having a second excitation coil 110 including a counter-clockwise winding portion 110A and a clockwise winding portion 110B. A first sensing coil and a second sensing coil of the first angular position sensor are positioned within an interior of a semicircular area formed by the first excitation coil 105. A third sensing coil and a fourth sensing coil of the second angular position sensor are positioned within an interior of a semicircular area formed by the second excitation coil 110, as is shown in FIG. 2.

As shown in FIG. 1, the redundant angular position sensor 100 additionally includes a rotatable inductive coupling element 150 having a radius 188 substantially equal to a radius 186 of the first excitation coil 105 and/or substantially equal to a radius 184 of the second excitation coil 110. The rotatable inductive coupling element 150 further comprises a plurality of sector apertures 160, 165, 170, 175, each of the sector apertures having an angle equal to an angle of a winding portion of one of the sensing coils of the first angular position sensor and/or the second angular position sensor. In a specific embodiment, the rotatable inductive coupling element 150 comprises a non-ferromagnetic conductive material. As shown in FIG. 1, in a particular embodiment, the rotatable inductive coupling element 150 may be described as comprising four 90° sectors 162, 167, 172, 177 with each of the 90° sectors 162, 167, 172, 177 comprising a sector aperture having an angle of 22.5° and a non-ferromagnetic conductive sector having an angle of 67.5°. In particular the rotatable inductive coupling element 150 includes, a first 90° sector 162 comprises a first sector aperture 160 having an angle of 22.5° and a first non-ferromagnetic conductive sector 161 having an angle of 67.5°, a second 90° sector 167 comprises a second sector aperture 165 having an angle of 22.5° and a second non-ferromagnetic conductive sector 166 having an angle of 67.5°, a third 90° sector 172 comprises a third sector aperture 170 having an angle of 22.5° and a third non-ferromagnetic conductive sector 171 having an angle of 67.5° and a fourth 90° sector 177 comprises a fourth sector aperture 175 having an angle of 22.5° and a fourth non-ferromagnetic conductive sector 176 having an angle of 67.5°. As such, it is shown that, the first sector aperture 160 comprises 25% of the first 90° sector 162 and the first non-ferromagnetic conductive sector 161 comprises 75% of the first 90° sector 162, the second sector aperture 165 comprises 25% of the second 90° sector 167 and the second non-ferromagnetic conductive sector 166 comprises 75% of the second 90° sector 167, the third sector aperture 170 comprises 25% of the third 90° sector 172 and the third non-ferromagnetic conductive sector 171 comprises 75% of the third 90° sector 172 and the fourth sector aperture 175 comprises 25% of the fourth 90° sector 177 and the fourth non-ferromagnetic conductive sector 176 comprises 75% of the fourth 90° sector 177. In general, all four of the sector apertures in combination comprise about 25% of the total area of the rotatable inductive coupling element 150 and the remaining 75% of the total area of the rotatable inductive coupling element 150 is comprised of non-ferromagnetic conductive material. The rotatable inductive coupling element 150 is positioned in overlying relation to, and separated from, the first excitation coil 105 and the second excitation coil 110 by a gap 180. In a particular embodiment, the rotatable inductive coupling element 150 is comprised of a non-ferromagnetic conductive material.

Figure 2:
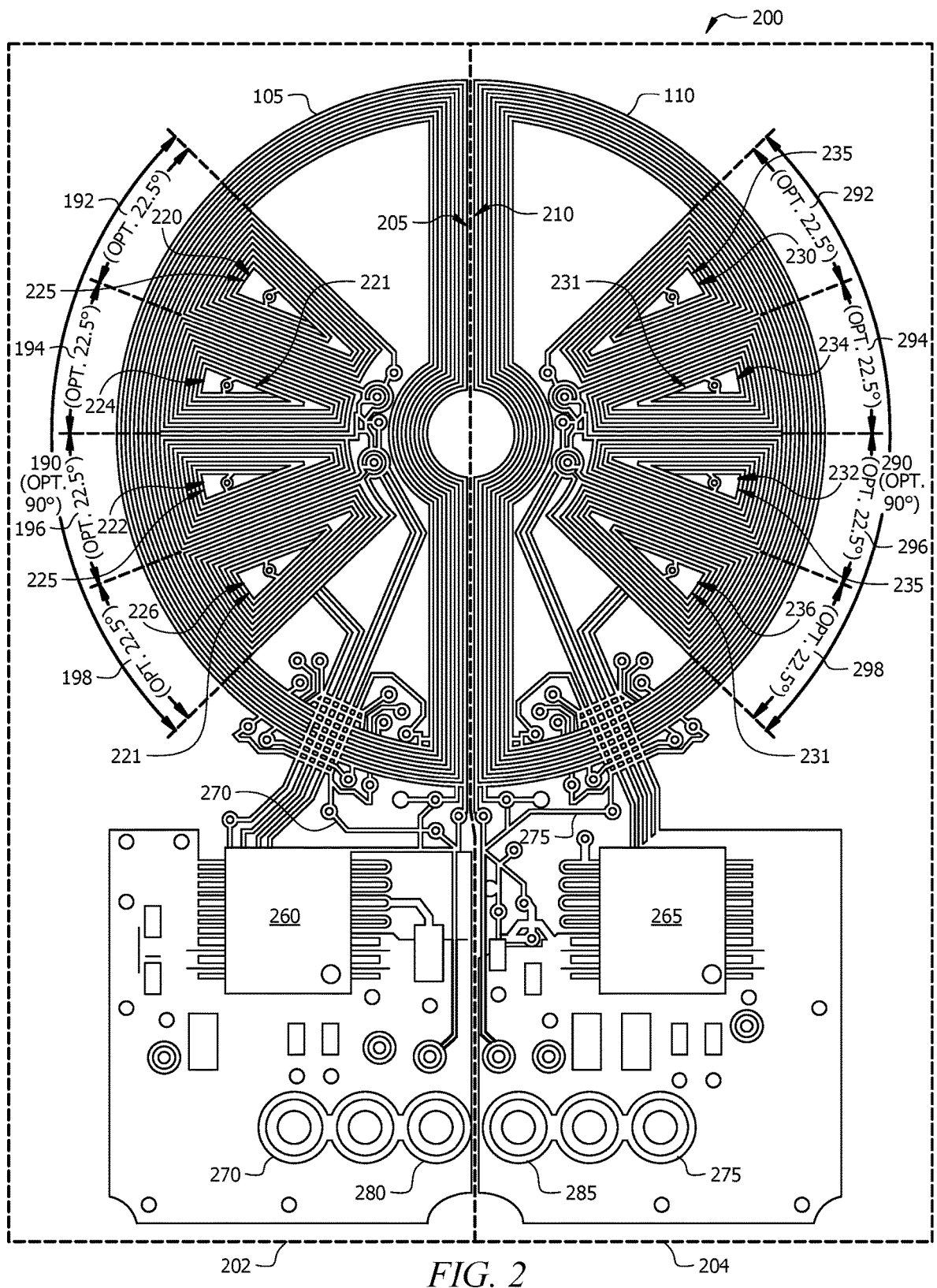
FIG. 2 illustrates the coil layout of a redundant angular position sensor comprising a first angular position sensor and a second angular position sensor, in accordance with an embodiment of the present invention.

The coil layout 200 and associated circuitry of the redundant angular position sensor of FIG. 1 are shown in more detail in FIG. 2. As shown in FIG. 2, the coil layout 200 includes a first angular position sensor 202 comprising first excitation coil 105, a first sensing coil 225 and a second sensing coil 221. The first sensing coil 225 includes a clockwise winding portion 220 and a counter-clockwise winding portion 222 and the second sensing coil 221 includes a clockwise winding portion 224 and a counter-clockwise winding portion 226. The clockwise winding portion 220 and the counter-clockwise portion 222 of the first sensing coil 225 and the clockwise winding portion 224 and the counter-clockwise winding portion 226 of the second sensing coil 221 are each positioned in respective equal sectors inside a first interior area defined by the first excitation coil 105 forming a first semicircular area. The coil layout 200 additionally includes a second angular position sensor 204 that operates independently of the first angular position sensor 202. The second angular position sensor 204 includes second excitation coil 110, a third sensing coil 235 and a fourth sensing coil 231. The third sensing coil 235 includes a clockwise winding portion 230 and a counter-clockwise winding portion 232 and the fourth sensing coil 231 includes a clockwise winding portion 234 and a counter-clockwise winding portion 236. The clockwise winding portion 230 and the counter-clockwise portion 232 of the third sensing coil 235 and the clockwise winding portion 234 and the counter-clockwise winding portion 236 of the fourth sensing coil 231 are each positioned in respective equal sectors inside a second interior area defined by the second excitation coil 110 forming a second semicircular area. In the present invention, a clockwise winding portion is defined as a winding portion wherein the direction of current flow through the winding portion is in a clockwise direction when the current flow through the counter-clockwise winding portion is in the counter-clockwise direction, and a counter-clockwise winding portion is defined as a winding portion wherein the direction of current flow through the winding portion is in a counter-clockwise direction when the current through the clockwise winding portion is in the clockwise direction. Those skilled in the art will recognize that the excitation signal is an AC signal, and thus the term clockwise and counter-clockwise, as used throughout, is not meant as a fixed direction, but is rather to establish that the currents at any point in time are flowing in opposite directions.

As shown, the winding portions 220, 222 of the first sensing coil 225 and the winding portions 224, 226 of the second sensing coil 221 are each alternately positioned within a respective one of four equal subsectors of a major sector 190 of the first excitation coil 105. In a specific embodiment, the first sensing coil 225 and the second sensing coil 221 of the first angular position sensor 202 are positioned within a major sector 190 of the first excitation coil 105 having a central angle of about 90°. In particular, a first winding portion 220 of the first sensing coil 225 is positioned in a first subsector 192 having a central angle of about 22.5°, a first winding portion 224 of the second sensing coil 221 is positioned in a second subsector 194 having a central angle of about 22.5°, a second winding portion 222 of the first sensing coil 225 is positioned in a third subsector 196 having a central angle of about 22.5° and a second winding portion 226 of the second sensing coil 221 is positioned in a fourth subsector 198 having a central angle of about 22.5°.

As also shown, the winding portions 230, 232 of the third sensing coil 235 and the winding portions 234, 236 of the fourth sensing coil 231 are each alternately positioned within a respective one of four equal subsectors of a major sector 290 of the second excitation coil 110. In a specific embodiment, the third sensing coil 235 and the fourth sensing coil 231 of the second sensor 204 are positioned within a major sector 290 of the second excitation coil 110 having a central angle of about 90°. In particular, a first winding portion 230 of the third sensing coil 235 is positioned in a first subsector 292 having a central angle of about 22.5°, a first winding portion 234 of the fourth sensing coil 231 is positioned in a second subsector 294 having a central angle of about 22.5°, a second winding portion 232 of the third sensing coil 235 is positioned in a third subsector 296 having a central angle of about 22.5° and a second winding portion 236 of the fourth sensing coil 231 is positioned in a fourth subsector 298 having a central angle of about 22.5°.

It follows from FIG. 1 that, each of the sector apertures 160, 165, 170, 175 of the rotatable inductive coupling element 150 has a central angle of about 22.5° when each of the winding portions 220, 222, 224, 226, 230, 232, 234, 236 of the first angular position sensor 202 and the second angular position sensor 204 are positioned in a subsector having a central angle of about 22.5°.

As shown in FIG. 2, each of the first excitation coil 105 and the second excitation coil 110 form a 180° arc having the two sides of the arc connected by a line segment. The length of the line segment between the two sides of the arc is referred to herein as the diameter of the excitation coil. As illustrated, the diameter 205 of the first excitation coil 105, wherein diameter 205 defines the border of the first semicircular area formed by the first excitation coil 105, and the diameter 210 of the second excitation coil 110, wherein diameter 210 defines the border of the second semicircular area formed by the second excitation coil 105, are positioned adjacent to each other to form a complete circle surrounding the first sensing coil 225, the second sensing coil 221, the third sensing coil 235 and the fourth sensing coil 231.

As illustrated in FIG. 2, the first angular position sensor 202 comprises a first voltage supply 270 and a first ground node 280 and the second angular position sensor 204 comprises a second voltage supply 275 and a second ground node 285. In the present invention, the first voltage supply 270 is independent of the second voltage supply 275 and the first ground node 280 is independent of the second ground node 285. The redundant angular position sensor 100 of the present invention further includes a first voltage sensing circuit 260 coupled to the first angular position sensor 202 and a second voltage sensing circuit 265 coupled to the second angular position sensor 204. In particular, the first voltage sensing circuit 260 is coupled to the first sensing coil 225 and the second sensing coil 221 and the second voltage sensing circuit 265 is coupled to the third sensing coil 235 and the fourth sensing coil 231.

In operation, the first and second excitation coils 105, 110 of the respective first angular position sensor 202 and second angular position sensor 204 are excited with a high frequency signal, such as a 5 MHz signal, to generate an alternating current (AC) magnetic field. The AC magnetic field generated by the first excitation coil 105 couples to the first sensing coil 225 and the second sensing coil 221 and the AC magnetic field generated by the second excitation coil 110 couples to the third sensing coil 235 and the fourth sensing coil 231, thereby generating a voltage in the respective winding portions 220, 222, 224, 226, 230, 232, 234, 236 of the sensing coils 221, 225, 231, 235. Positioning the rotatable inductive coupling element 150 within the magnetic field induces eddy currents in the rotatable inductive coupling element 150 which dampens the time varying magnetic field in the region of the respective winding portions 220, 222, 224, 226, 230, 232, 234, 236 of sensing coils 221, 225, 231, 235 covered by the rotatable inductive coupling element 150. As a result of the induction of eddy currents in the rotatable inductive coupling element 150, the time varying voltage induced in the respective windings portions 220, 222, 224, 226, 230, 232, 234, 236 of the sensing coils 221, 225, 231, 235 covered by the rotatable inductive coupling element 150 are attenuated and the time varying voltage induced in the respective winding portions 220, 222, 224, 226, 230, 232, 234, 236 of the sensing coils 221, 225, 231, 235 that are not covered by the rotatable inductive coupling element 150, i.e. those covered by one of the sector apertures 160, 165, 170, 175, are not attenuated.

The position of the rotatable inductive coupling element 150 disturbs the generated AC magnetic field, resulting in modulated cosine and sine waveforms being generated by the sensing coils 221, 225, 231, 235. These modulated cosine and sine waveforms are provided to the respective voltage sensing circuit 260, 265. In a specific embodiment, the first voltage sensing circuit 260 may receive modulated cosine signals from the first sensing coil 225 and modulated sine signals from the second sensing coil 221, in the presence of the rotatable inductive couple element 150. The first voltage sensing circuit 260 then demodulates the received signals and calculates position information by performing an arctangent calculation of the ratio of the cosine and sine signals. Additionally, the second voltage sensing circuit 265 may receive modulated cosine signals from the third sensing coil 235 and modulated sine signals from the fourth sensing coil 231, in the presence of the rotatable inductive couple element 150. The second voltage sensing circuit 265 then demodulates the received signals and calculates position information by performing an arctangent calculation of the ratio of the cosine and sine signals.

To provide an angular position sensor having redundancy, separate voltage supplies 270, 275 and separate ground nodes 280, 285 are established for each of the two independent excitation coils 105, 110. Additionally, independent cosine sensing coils 225, 235 and sine sensing coils 221, 231 are provided to complete the redundancy.

In operation, while one of the angular position sensors 202, 204 may be disabled due to a short-circuit, for example as a result of a short-circuit between the respective voltage supply 270, 275 and the respective ground node 280, 285, the other of the angular position sensors 202, 204 will continue to be operational. As such, a single fault at a particular component of the first angular position sensor 202 or the second angular position sensor 204 will not cause both angular position sensors 202, 204 to fail.

In a specific implementation, to provide the required redundancy for critical applications, a single fault must not lead to both angular position sensors 202, 204 outputting a value that is 5% over the nominal sensor output. However, in prior art sensor designs employing circular excitation coils, the excitation coils are interlaced and as such, when there is a short-circuit between the voltage supply and ground at one of the excitation coils, a mutual inductance coupling effect may cause the other sensor to also enter into a fault mode. In contrast, in the proposed angular position sensor 100 of the present invention, since the two sensors 202, 204 are completely independent, with very minimal mutual coupling effect, the redundant angular position sensor 100 is capable of meeting the safety requirements.

Figure 3A:
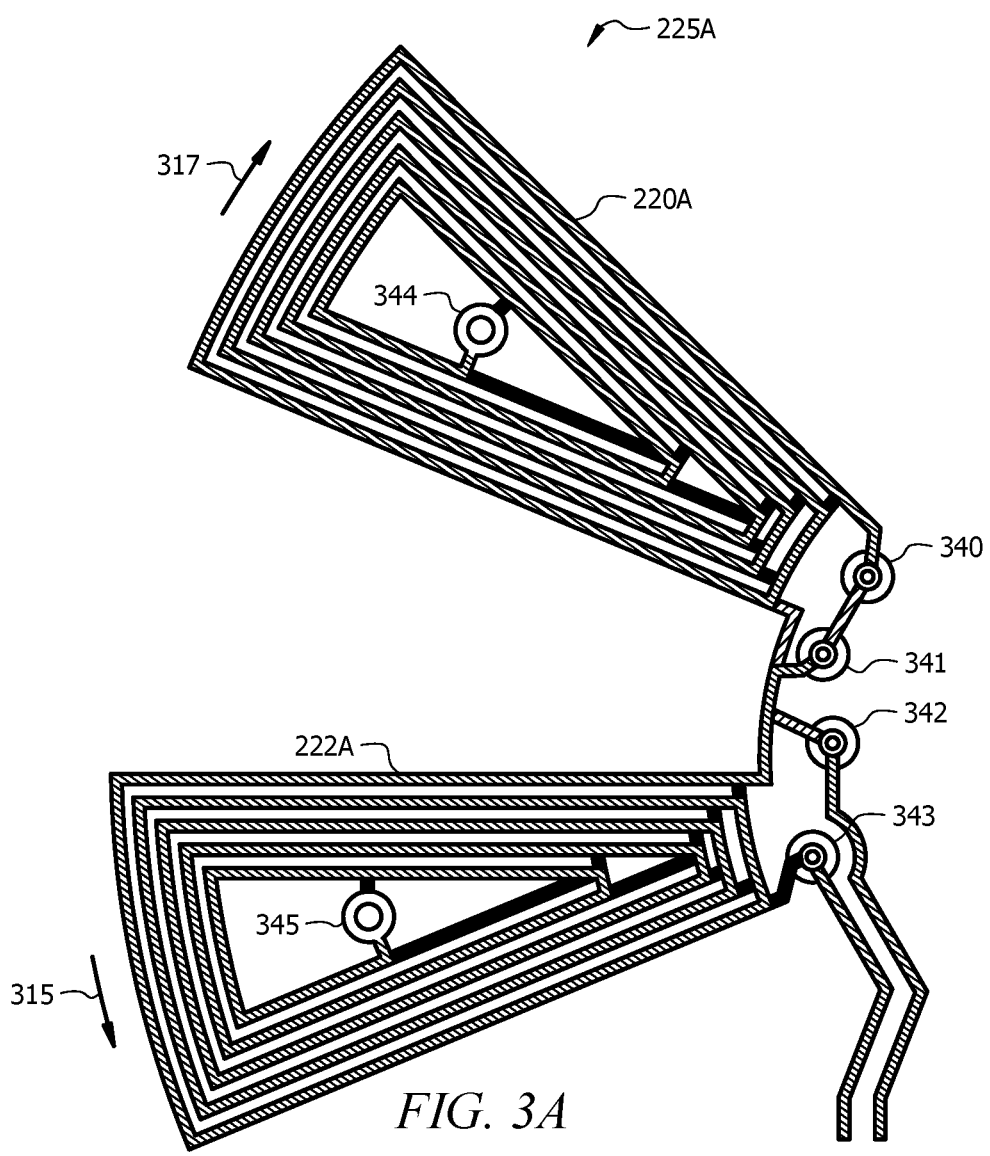
FIG. 3A illustrates the winding turns of a first sensing coil of a redundant angular position sensor positioned on a first PCB layer of a multilayer circuit board, in accordance with an embodiment of the present invention.
Figure 3B:
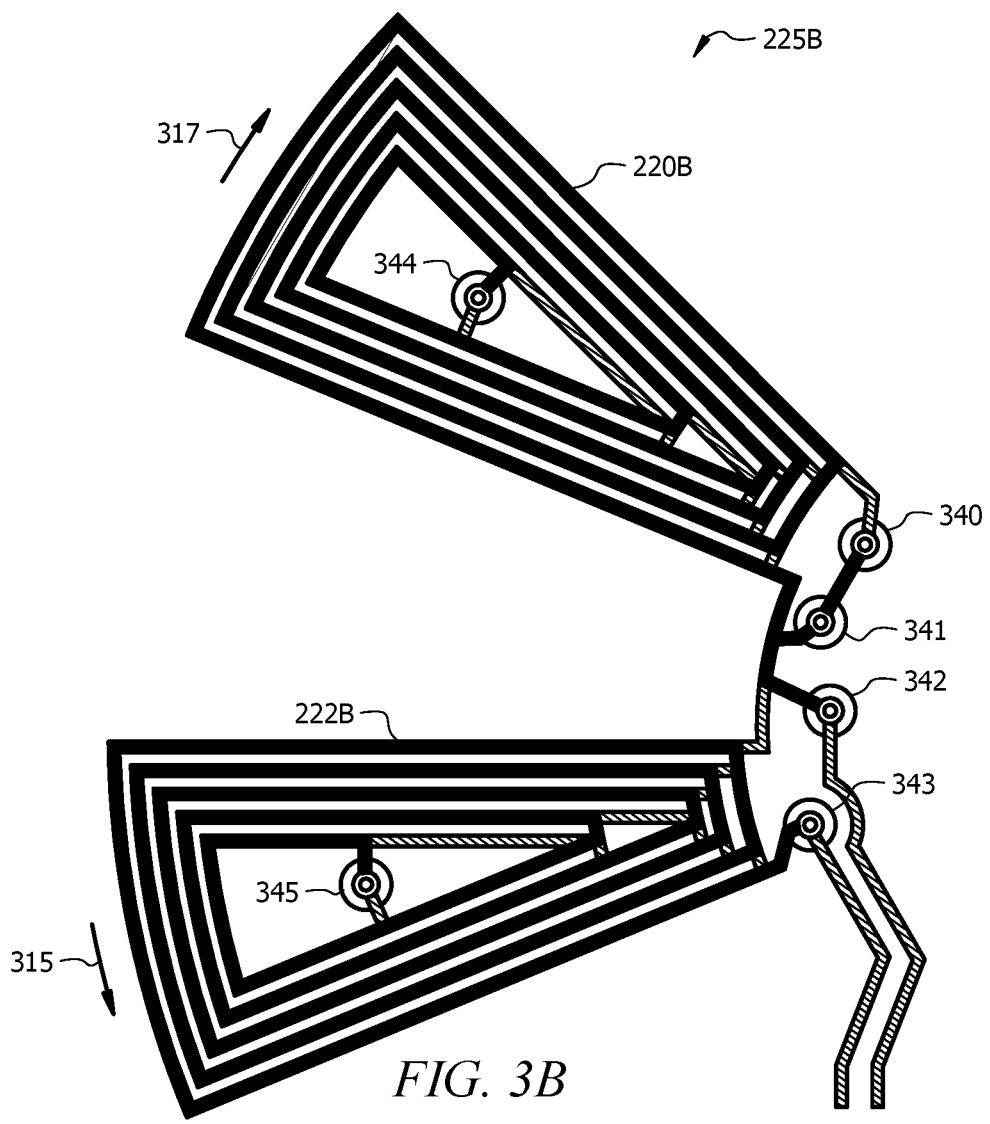
FIG. 3B illustrates the winding turns of a first sensing coil of a redundant angular position sensor positioned on a second PCB layer of a multilayer circuit board, in accordance with an embodiment of the present invention.

FIG. 3A and FIG. 3B illustrate the first sensing coil 225 of the first angular position sensor 202 in greater detail. The winding turns of the first sensing coil 225 may be positioned on two different layers of the printed circuit board (PCB). FIG. 3A provides a view of the winding turns 225A of the first sensing coil 225 positioned on a first layer of the PCB and FIG. 3B provides a view of the winding turns 225B of the first sensing coil 225 positioned on a second layer of the PCB. As shown in FIG. 3A, first winding turns 222A of the counter-clockwise winding portion 222 of the first sensing coil 225 (FIG. 2) are positioned on a first layer of the PCB and second winding turns 222B of the counter-clockwise winding portion 222 of the first sensing coil 225 are positioned on a second layer of the PCB, as shown in FIG. 3B. The first winding turns 222A and the second winding turns 222B are connected by a via 345. Additionally, as shown in FIG. 3A, first winding turns 220A of the clockwise winding portion 220 of the first sensing coil 225 (FIG. 2) are positioned on a first layer of the PCB and second winding turns 220B of the clockwise winding portion 220 of the first sensing coil 225 are positioned on a second layer of the PCB, as shown in FIG. 3B. The first winding turns 220A and the second winding turns 220B are connected by a via 344. Additional vias 340, 341, 342, 343 are used to provide connections between the PCB layers, as is commonly known in the art. As shown, in the exemplary embodiment of FIG. 3A and FIG. 3B, current travels in a counter-clockwise direction 315 in the first winding turns 222A and the second winding turns 222B of the counter-clockwise winding portion 222 of the first sensing coil 221 and current travels in a clockwise direction 317 in the first winding turns 220A and the second winding turns 220B of the clockwise winding portion 220 of the first sensing coil 221. As indicated above, the excitation signal is an AC signal, and as such, the terms clockwise and counter-clockwise, as used throughout, are not meant as a fixed direction, but rather to establish that the currents at any point in time are flowing in opposite directions.

Figure 3C:
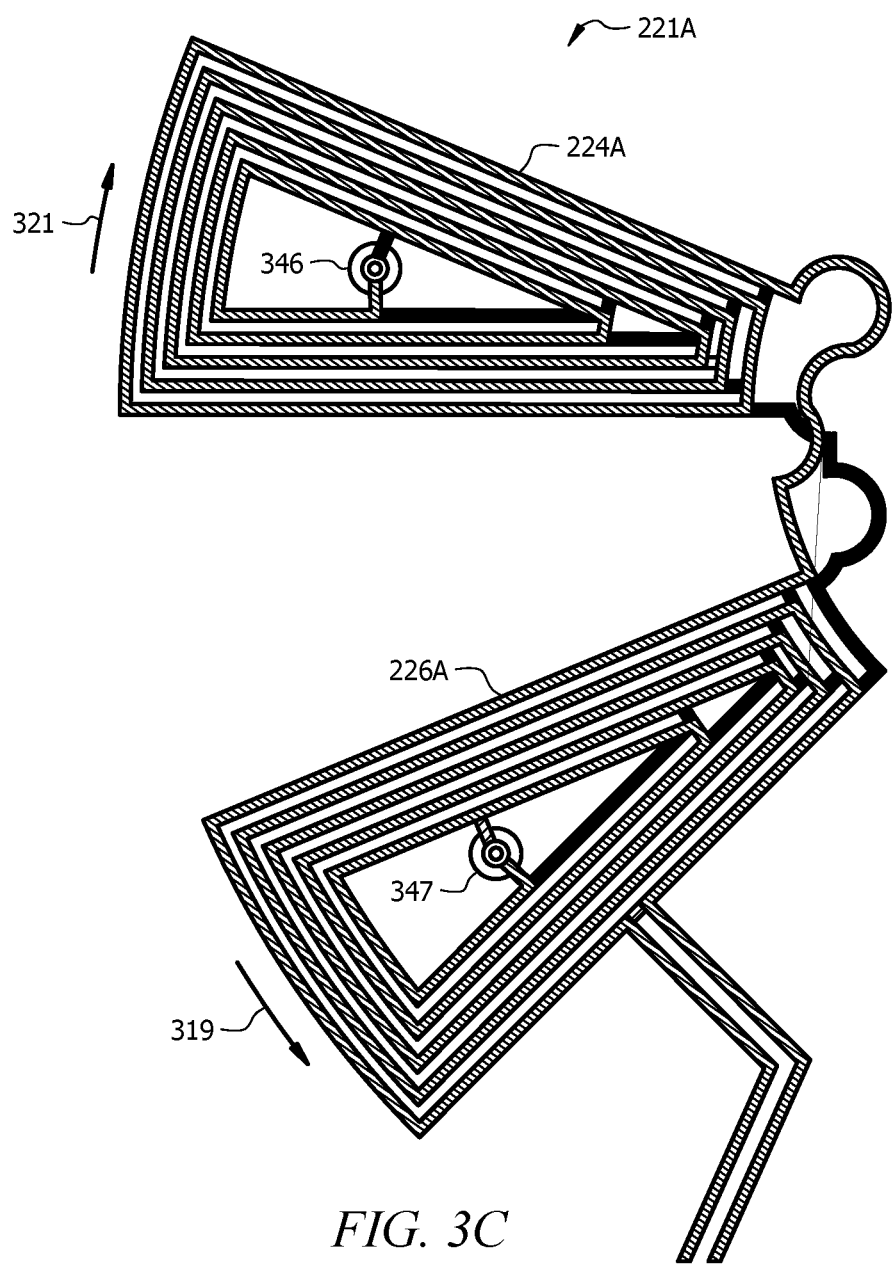
FIG. 3C illustrates the winding turns of a third sensing coil of a redundant angular position sensor positioned on a first PCB layer of a multilayer circuit board, in accordance with an embodiment of the present invention.
Figure 3D:
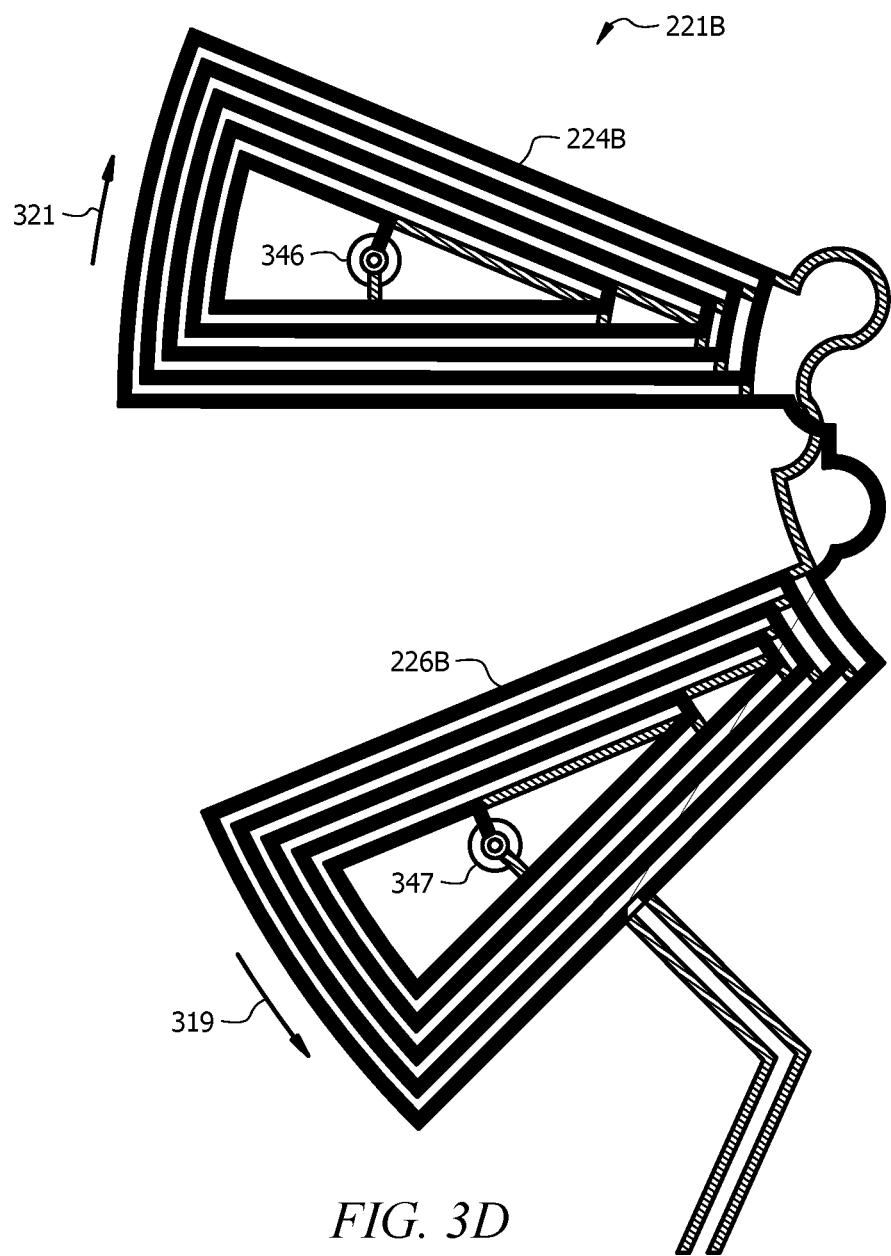
FIG. 3D illustrates the winding turns of a fourth sensing coil of a redundant angular position sensor positioned on a second PCB layer of a multilayer circuit board, in accordance with an embodiment of the present invention.

FIG. 3C and FIG. 3D illustrate the second sensing coil 221 of the first angular position sensor 202 (FIG. 2) in greater detail. The winding turns of the second sensing coil 221 may be positioned on two different layers of the printed circuit board (PCB). FIG. 3C provides a view of the winding turns 221A of the second sensing coil 221 positioned on a first layer of the PCB and FIG. 3D provides a view of the winding turns 221B of the second sensing coil 221 positioned on a second layer of the PCB. As shown in FIG. 3C, first winding turns 226A of the counter-clockwise winding portion 226 of the second sensing coil 221 (FIG. 2) are positioned on a first layer of the PCB and second winding turns 226B of the counter-clockwise winding portion 226 of the second sensing coil 221 are positioned on a second layer of the PCB, as shown in FIG. 3D. The first winding turns 226A and the second winding turns 226B are connected by a via 347. Additionally, as shown in FIG. 3C, first winding turns 224A of the clockwise winding portion 224 of the second sensing coil 225 (FIG. 2) are positioned on a first layer of the PCB and second winding turns 224B of the clockwise winding portion 224 of the second sensing coil 221 are positioned on a second layer of the PCB, as shown in FIG. 3D. The first winding turns 224A and the second winding turns 224B are connected by a via 346. As shown, in the exemplary embodiment of FIG. 3C and FIG. 3D, current travels in a counter-clockwise direction 319 in the first winding turns 226A and the second winding turns 226B of the counter-clockwise winding portion 226 of the second sensing coil 221 and current travels in a clockwise direction 321 in the first winding turns 224A and the second winding turns 224B of the clockwise winding portion 224 of the second sensing coil 221.

Figure 3E:
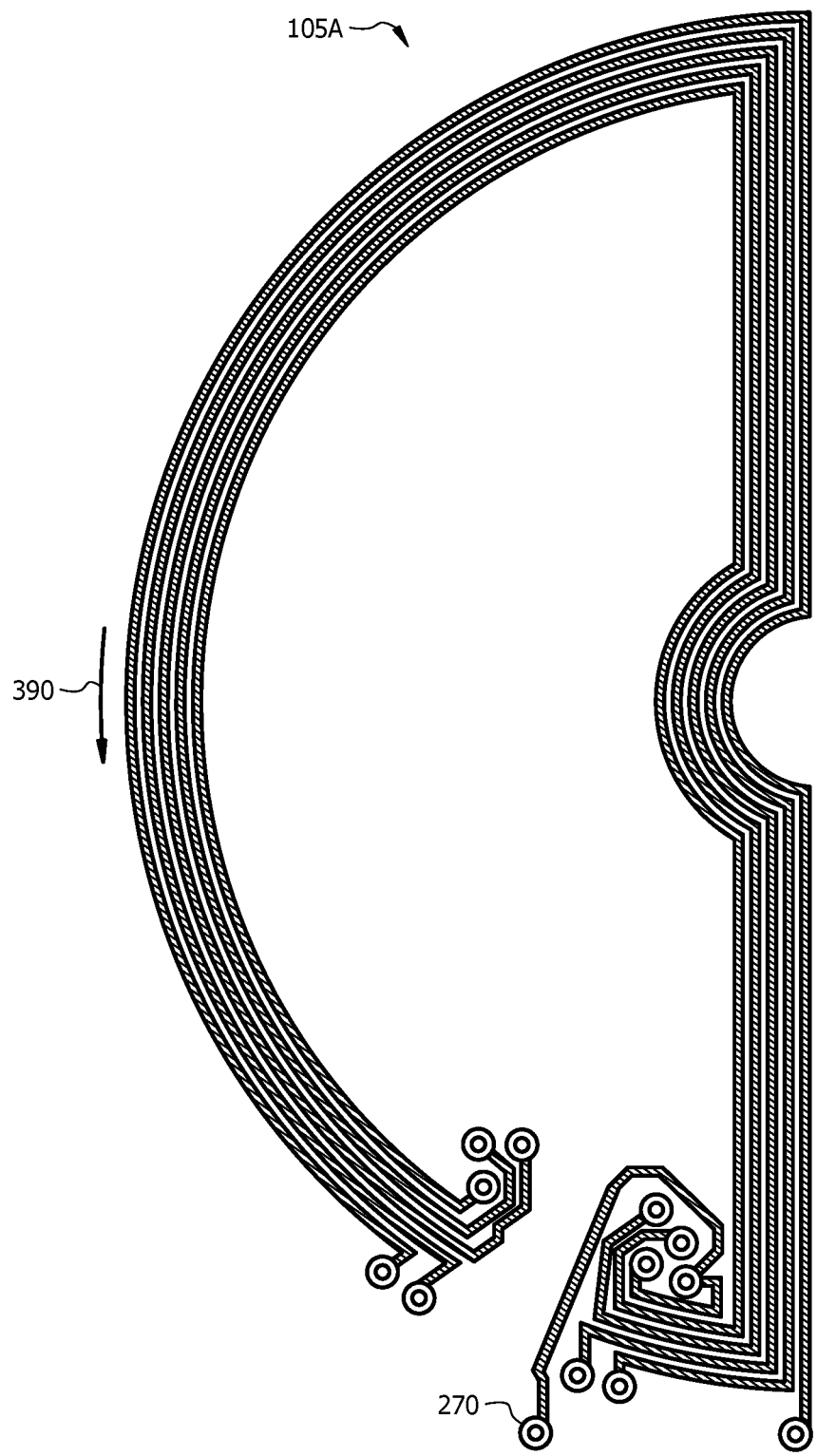
FIG. 3E illustrates a counter-clockwise winding portion of a first excitation coil of a redundant angular position sensor, in accordance with an embodiment of the present invention.
Figure 3F:
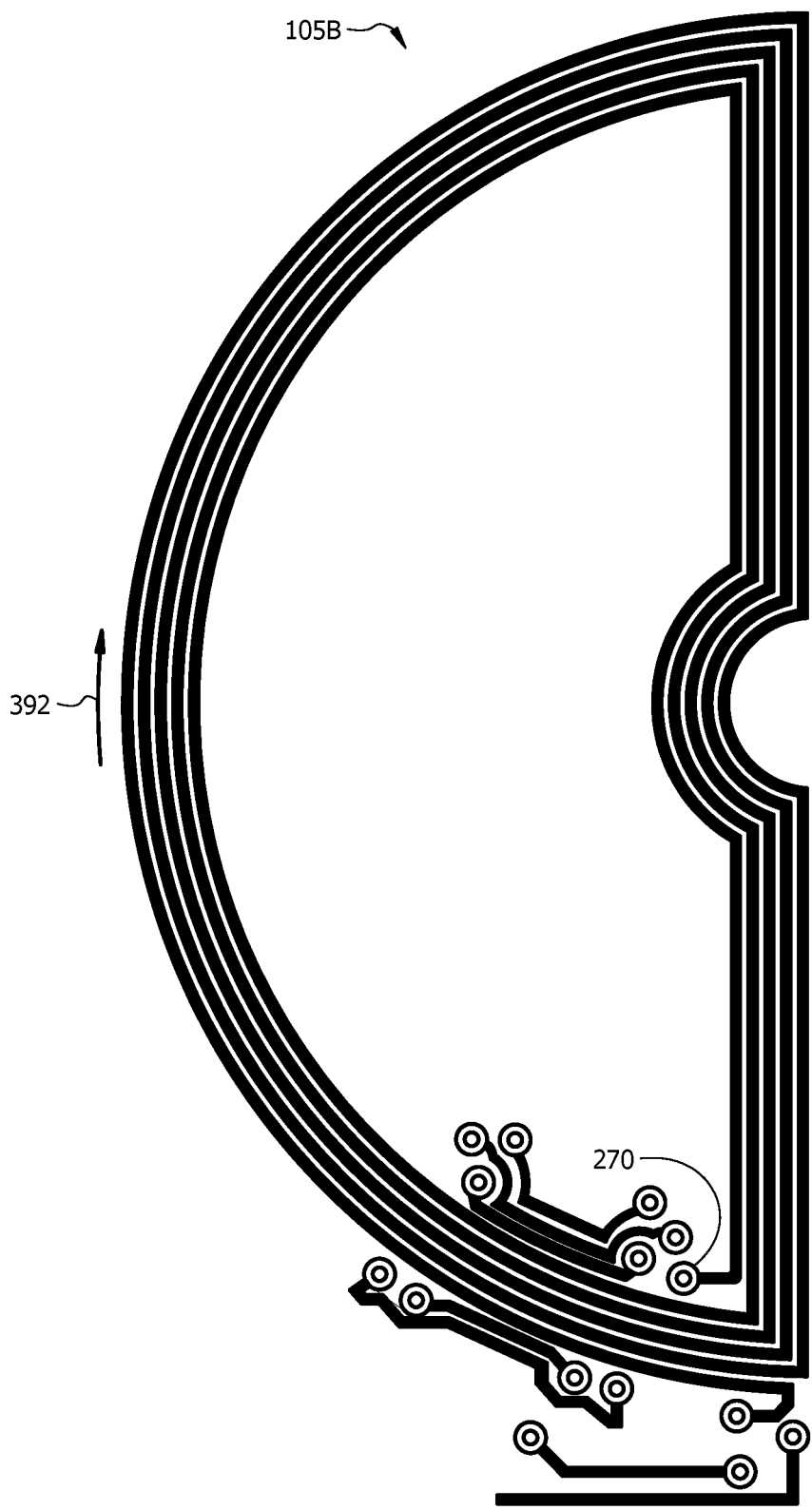
FIG. 3F illustrates a clockwise winding portion of a first excitation coil of a redundant angular position sensor, in accordance with an embodiment of the present invention.

The winding portions 105A, 105B of the first excitation coil 105 of the first angular position sensor 202 are shown in greater detail with reference to FIG. 3E and FIG. 3F. FIG. 3E illustrates the counter-clockwise winding portion 105A of the first excitation coil 105 and FIG. 3F illustrates a clockwise winding portion 105B of the first excitation coil 105. In a particular embodiment, the counter-clockwise winding portion 105A is positioned on a first layer of the PCB and the clockwise winding portion 105B is positioned on a second layer of the PCB. The first layer and the second layer may be connected by one or more vias, as is commonly known in the art. In operation, a center-tapped voltage supply 270 is provide to the counter-clockwise winding portion 105A and the clockwise winding portion 105B of the first excitation coil 105, causing current to flow in a counter-clockwise direction 390 in the counter-clockwise winding portion 105A of FIG. 3E and to flow in a clockwise direction 392 in the clockwise winding portion 105B shown in FIG. 3F. As previously described, the first excitation coil 105 generates an AC magnetic field, in response to receiving the center-tapped voltage supply 270, that is subsequently coupled to the first sensing coil 225 and the second sensing coil 221, depending upon the position of the rotatable inductive coupling element 150.

Figure 4A:
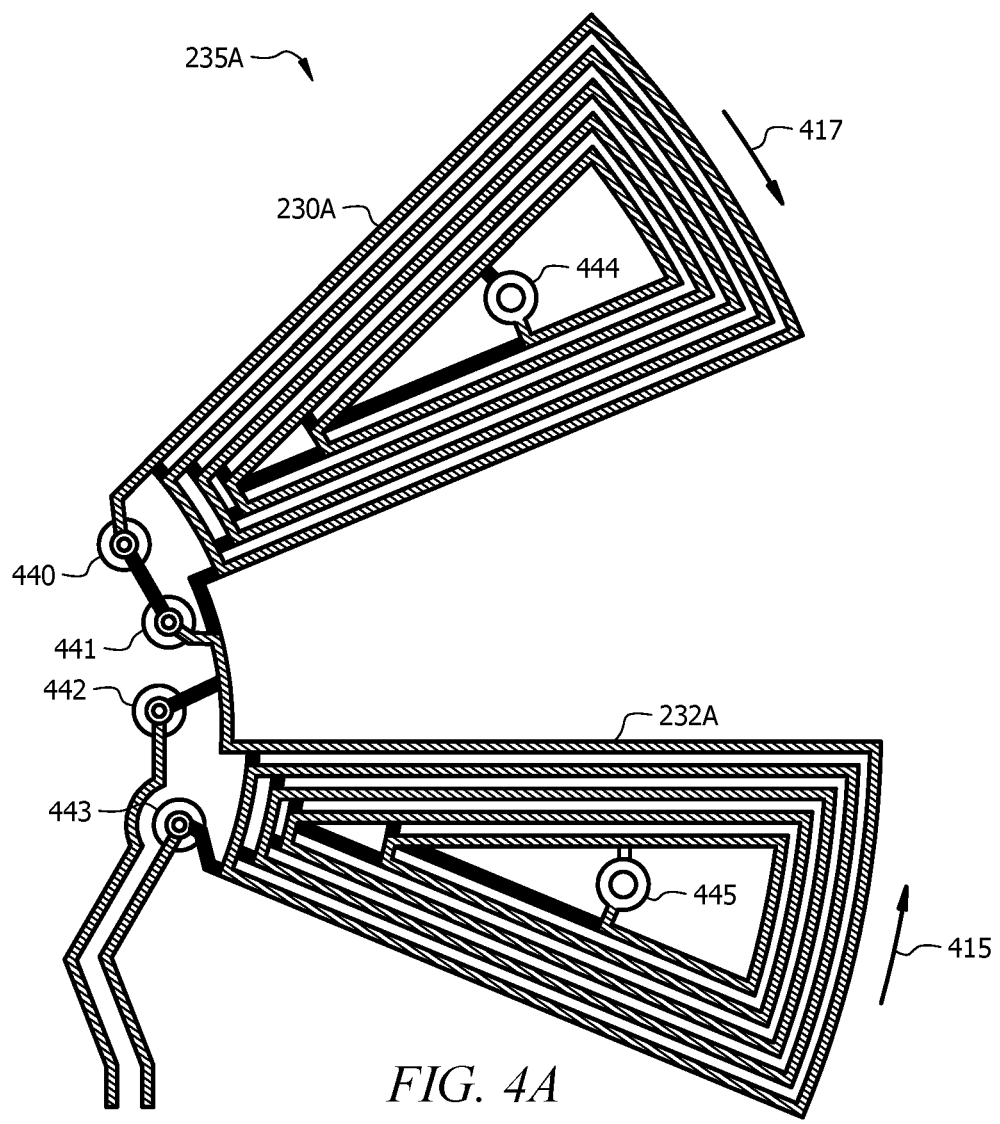
FIG. 4A illustrates the winding turns of a third sensing coil of a redundant angular position sensor positioned on a first PCB layer of a multilayer circuit board, in accordance with an embodiment of the present invention.
Figure 4B:
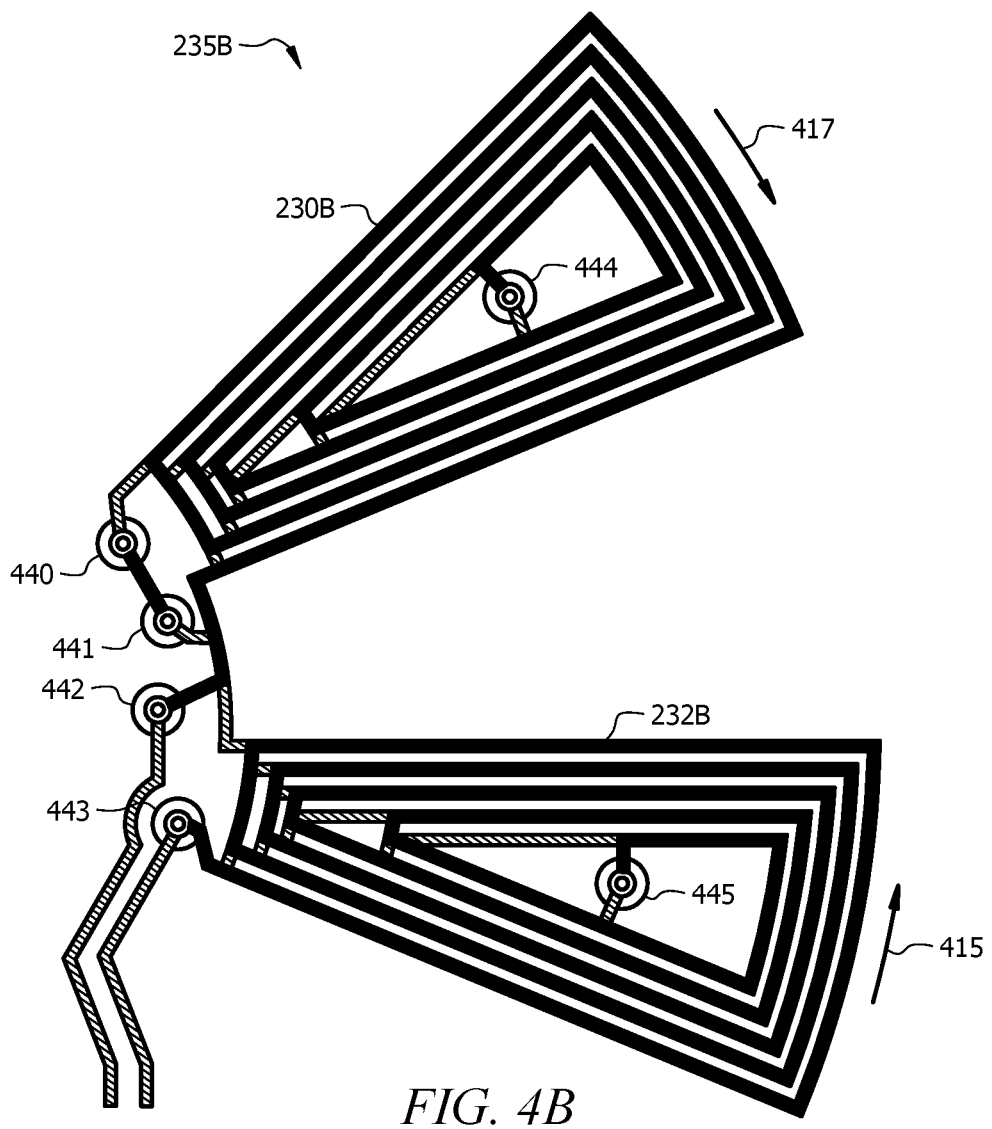
FIG. 4B illustrates the winding turns of a third sensing coil of a redundant angular position sensor positioned on a second PCB layer of a multilayer circuit board, in accordance with an embodiment of the present invention.

FIG. 4A and FIG. 4B illustrate the third sensing coil 235 of the second angular position sensor 204 of FIG. 2 in greater detail. The winding turns of the third sensing coil 235 may be positioned on two different layers of the printed circuit board (PCB). FIG. 4A provides a view of the winding turns 235A of the third sensing coil 235 on a first layer of the PCB and FIG. 4B provides a view of the winding turns 235B of the third sensing coil 235 on a second layer of the PCB. As shown in FIG. 4A, first winding turns 232A of the counter-clockwise winding portion 232 of the third sensing coil 235 (FIG. 2) are positioned on a first layer of the PCB and second winding turns 232B of the counter-clockwise winding portion 232 of the third sensing coil 235 are positioned on a second layer of the PCB, as shown in FIG. 4B. The first winding turns 232A and the second winding turns 232B are connected by a via 445. Additionally, as shown in FIG. 4A, first winding turns 230A of the clockwise winding portion 230 of the third sensing coil 235 are positioned on a first layer of the PCB and second winding turns 230B of the clockwise winding portion 230 of the third sensing coil 235 (FIG. 2) are positioned on a second layer of the PCB, as shown in FIG. 4B. The first winding turns 230A and the second winding turns 230B are connected by a via 444. Additional vias 440, 441, 442, 443 are used to provide connections between the PCB layers, as is commonly known in the art. As shown, in the exemplary embodiment of FIG. 4A and FIG. 4B, current travels in a counter-clockwise direction 415 in the first winding turns 232A and the second winding turns 232B of the counter-clockwise winding portion 232 of the third sensing coil 231 and current travels in a clockwise direction 417 in the first winding turns 230A and the second winding turns 230B of the clockwise winding portion 230 of the third sensing coil 235.

Figure 4C:
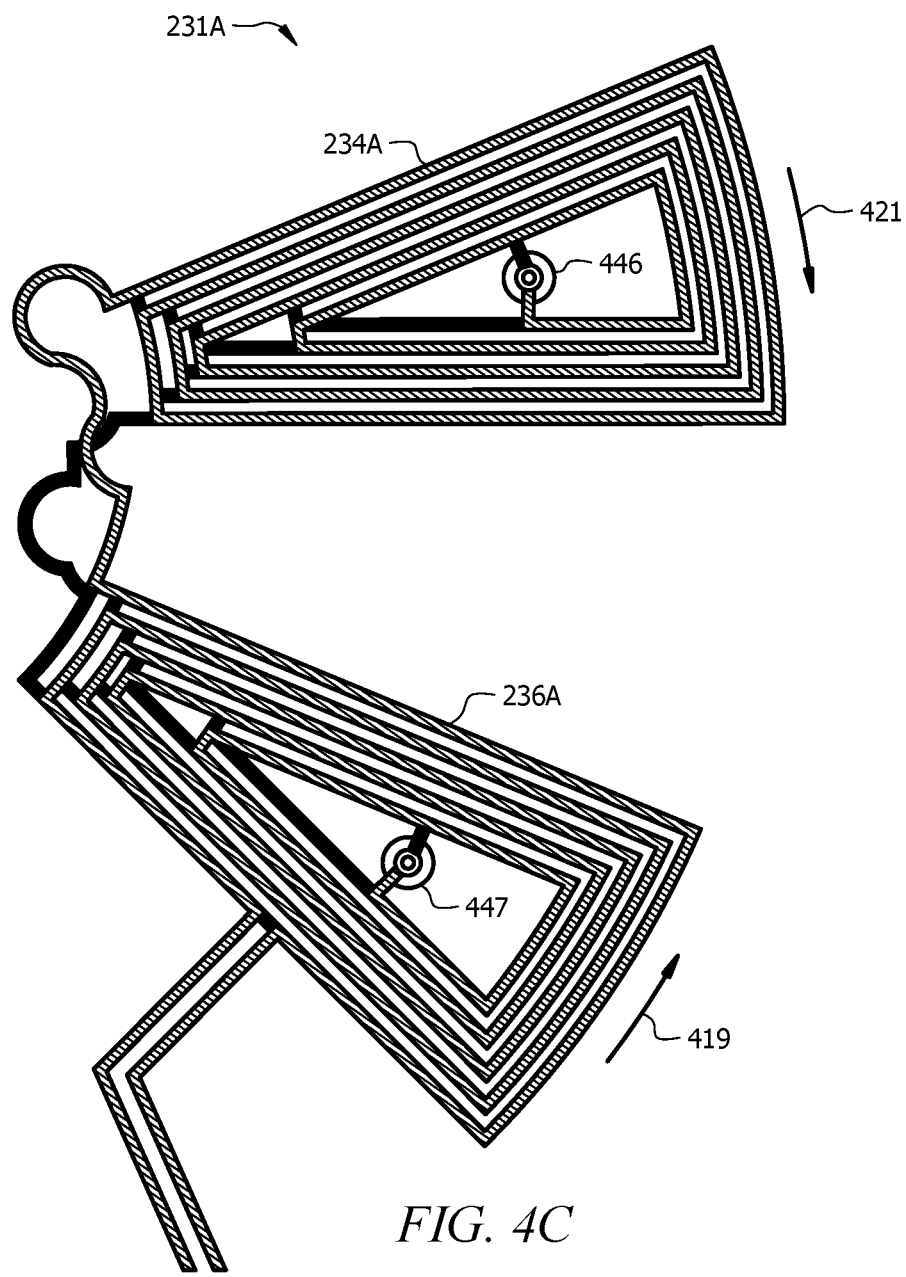
FIG. 4C illustrates the winding turns of a fourth sensing coil of a redundant angular position sensor positioned on a first PCB layer of a multilayer circuit board, in accordance with an embodiment of the present invention.
Figure 4D:
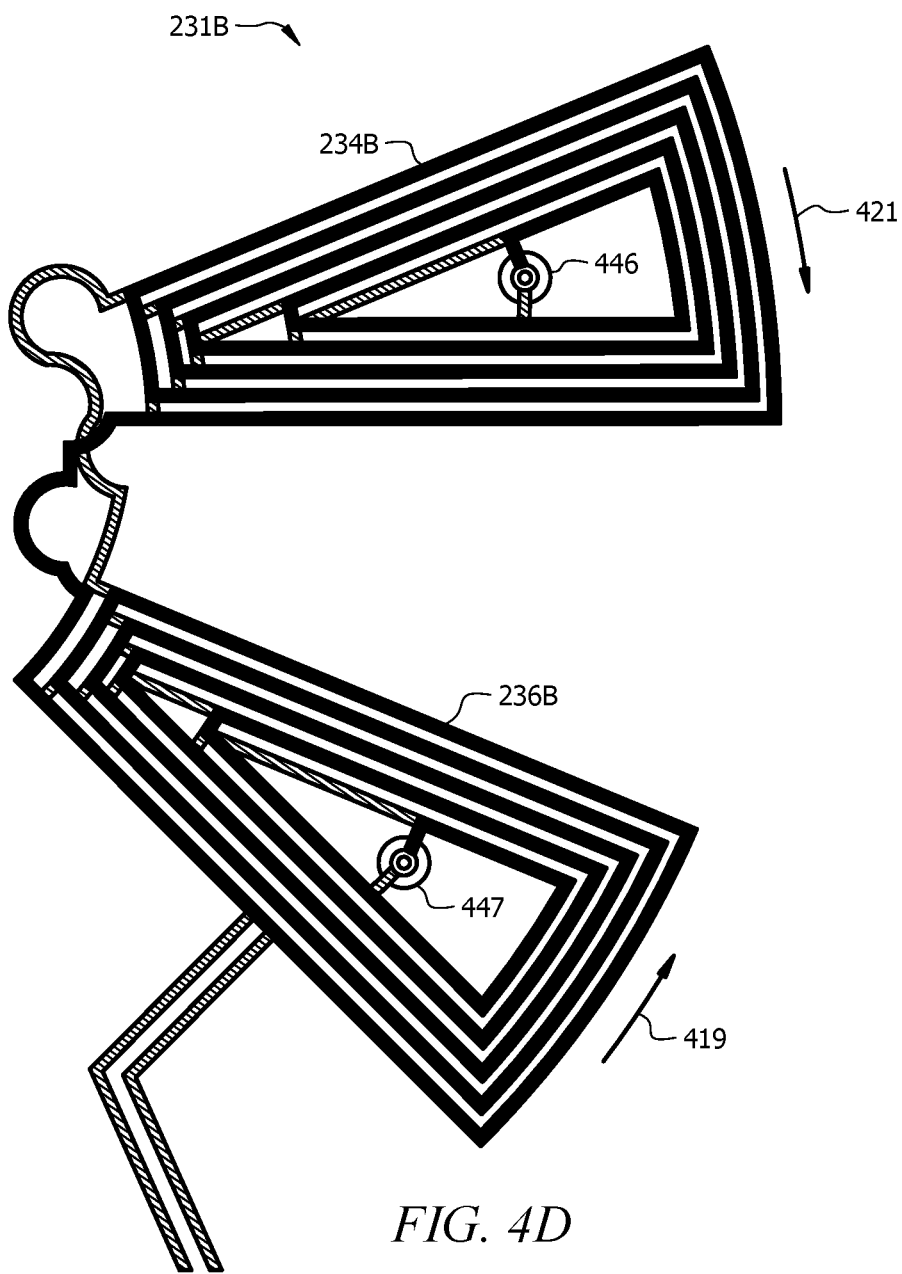
FIG. 4D illustrates the winding turns of a fourth sensing coil of a redundant angular position sensor positioned on a second PCB layer of a multilayer circuit board, in accordance with an embodiment of the present invention.

FIG. 4C and FIG. 4D illustrate the fourth sensing coil 231 of the second angular position sensor 204 of FIG. 2 in greater detail. The winding turns of the fourth sensing coil 231 may be positioned on two different layers of the printed circuit board (PCB). FIG. 4C provides a view of the winding turns 231A of the fourth sensing coil 231 on a first layer of the PCB and FIG. 4D provides a view of the winding turns 231B of the fourth sensing coil 231 on a second layer of the PCB. As shown in FIG. 4C, first winding turns 236A of the counter-clockwise winding portion 236 of the fourth sensing coil 235 are positioned on a first layer of the PCB and second winding turns 236B of the counter-clockwise winding portion 236 of the fourth sensing coil 231 are positioned on a second layer of the PCB, as shown in FIG. 4D. The first winding turns 236A and the second winding turns 236B are connected by a via 447. Additionally, as shown in FIG. 4D, first winding turns 234A of the clockwise winding portion 234 of the fourth sensing coil 231 are positioned on a first layer of the PCB and second winding turns 234B of the clockwise winding portion 234 of the fourth sensing coil 231 are positioned on a second layer of the PCB, as shown in FIG. 4D. The first winding turns 234A and the second winding turns 234B are connected by a via 446. As shown, in the exemplary embodiment of FIG. 4C and FIG. 4D, current travels in a counter-clockwise direction 419 in the first winding turns 236A and the second winding turns 236B of the counter-clockwise winding portion 236 of the fourth sensing coil 231 and current travels in a clockwise direction 421 in the first winding turns 234A and the second winding turns 234B of the clockwise winding portion 234 of the fourth sensing coil 231.

Figure 4E:
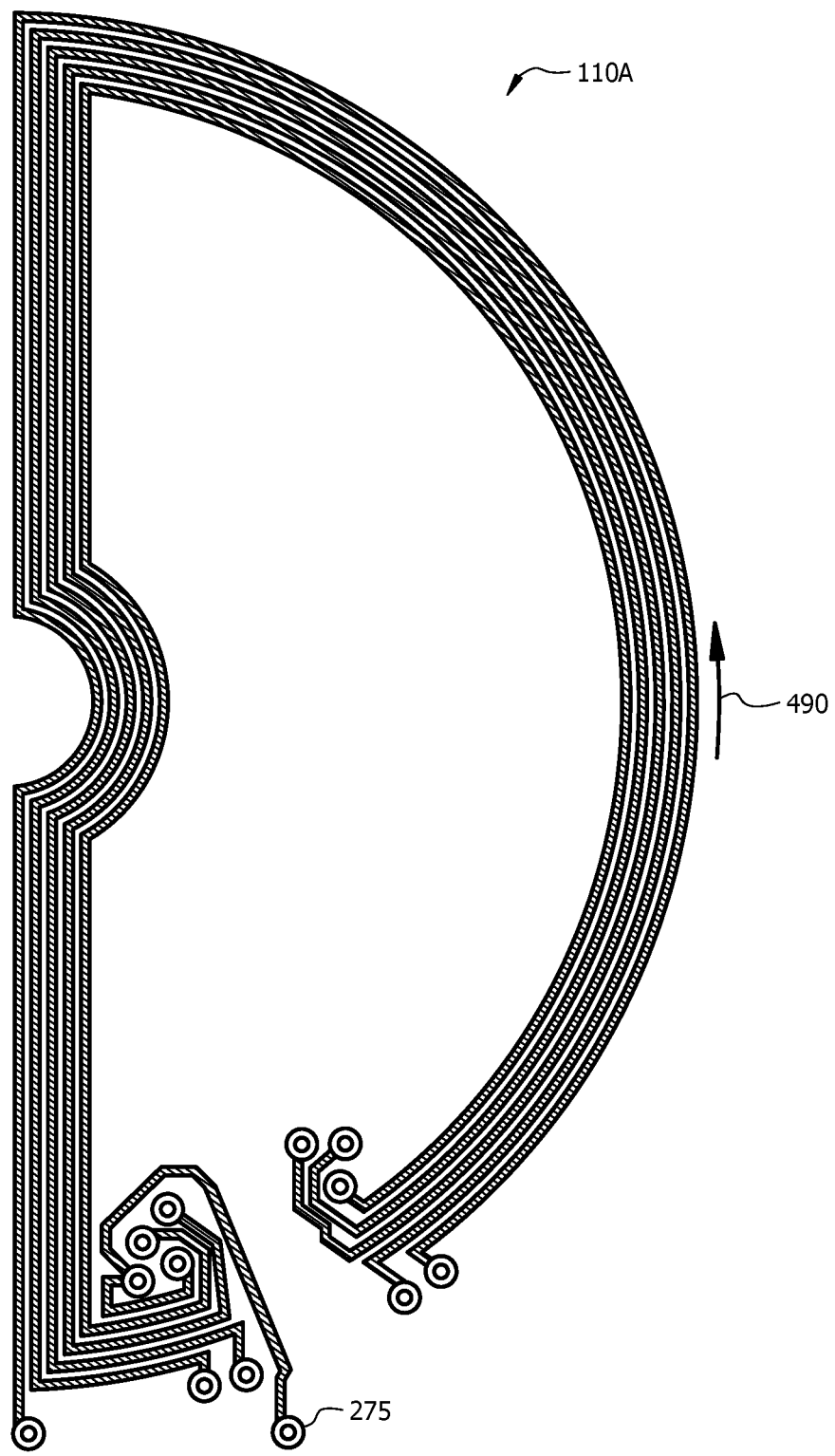
FIG. 4E illustrates a counter-clockwise winding portion of a second excitation coil of a redundant angular position sensor, in accordance with an embodiment of the present invention.
Figure 4F:
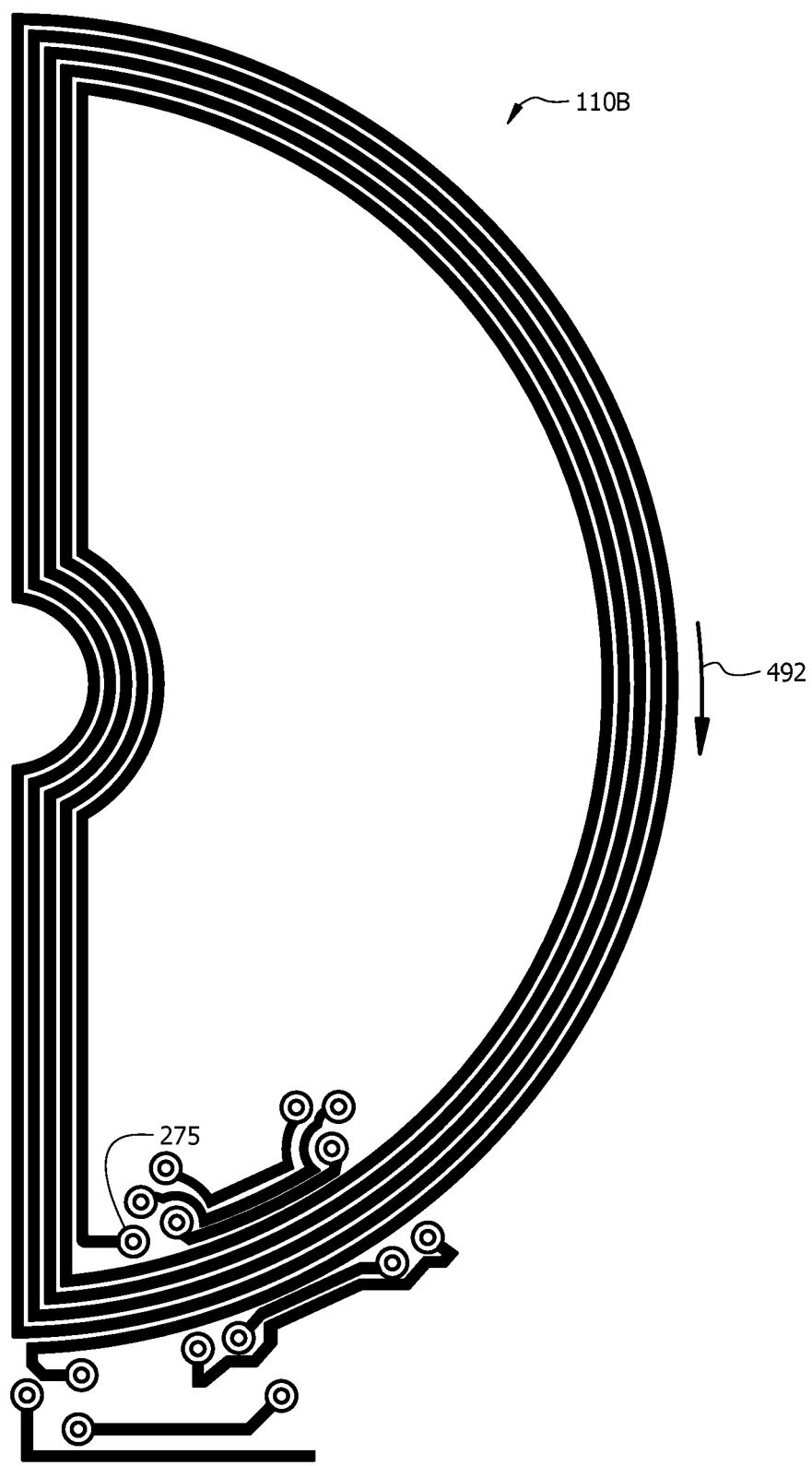
FIG. 4F illustrates a clockwise winding portion of a second excitation coil of a redundant angular position sensor, in accordance with an embodiment of the present invention.

The winding portions 110A, 110B of the second excitation coil 110 of the second angular position sensor 204 of FIG. 2 are shown in greater detail with reference to FIG. 4E and FIG. 4F. FIG. 4E illustrates the counter-clockwise winding portion 110A of the second excitation coil 110 and FIG. 4F illustrates the clockwise winding portion 110B of the second excitation coil 110. In a particular embodiment, the first winding portion 110A is positioned on a first layer of the PCB and the second winding portion 110B is positioned on a second layer of the PCB. The first layer and the second layer may be connected by one or more vias, as is commonly known in the art. In operation, a center-tapped voltage supply 275 is provide to the counter-clockwise winding portion 110A and the clockwise winding portion 110B of the second excitation coil 110, causing current to flow in a counter-clockwise direction 490 in the counter-clockwise winding portion 110A of FIG. 4E and to flow in a clockwise direction 492 in the clockwise winding portion 110B shown in FIG. 4F. As previously described, the second excitation coil 110 generates an AC magnetic field, in response to receiving the center-tapped voltage supply 275, that is subsequently coupled to the third sensing coil 235 and the fourth sensing coil 231, depending upon the position of the rotatable inductive coupling element 150.

As illustrated in FIG. 5A—FIG. 5D, as the rotatable inductive coupling element 150 is rotated 90° about a center axis 500, the magnitude of the time varying voltage induced in the winding portions 220, 222, 224, 226 of the first angular position sensor 202 and in the winding portions 230, 232, 234, 236 of the second angular position sensor 204 changes based upon the position of the sector apertures 160, 165, 170, 175 of the rotatable inductive coupling element 150 relative to the angular position sensors 202, 204. While the following description assumes that one or more of the sector apertures 160, 165, 170, 175 of the rotatable inductive coupling element 150 is positioned to be substantially aligned with one of the winding portions of the first and second angular position sensors 202, 204, it is understood that one or more of the winding portions 220, 222, 224, 226, 230, 232, 234, 236 could be only partially covered by the rotatable inductive coupling element 150 due to the positioning of any one of the sector apertures 160, 165, 170, 175 in relation to the respective winding portions 220, 222, 224, 226, 230, 232, 234, 236 of the first and second angular position sensors 202, 204 as the rotatable inductive coupling element 150 is rotated.

Figure 5A:
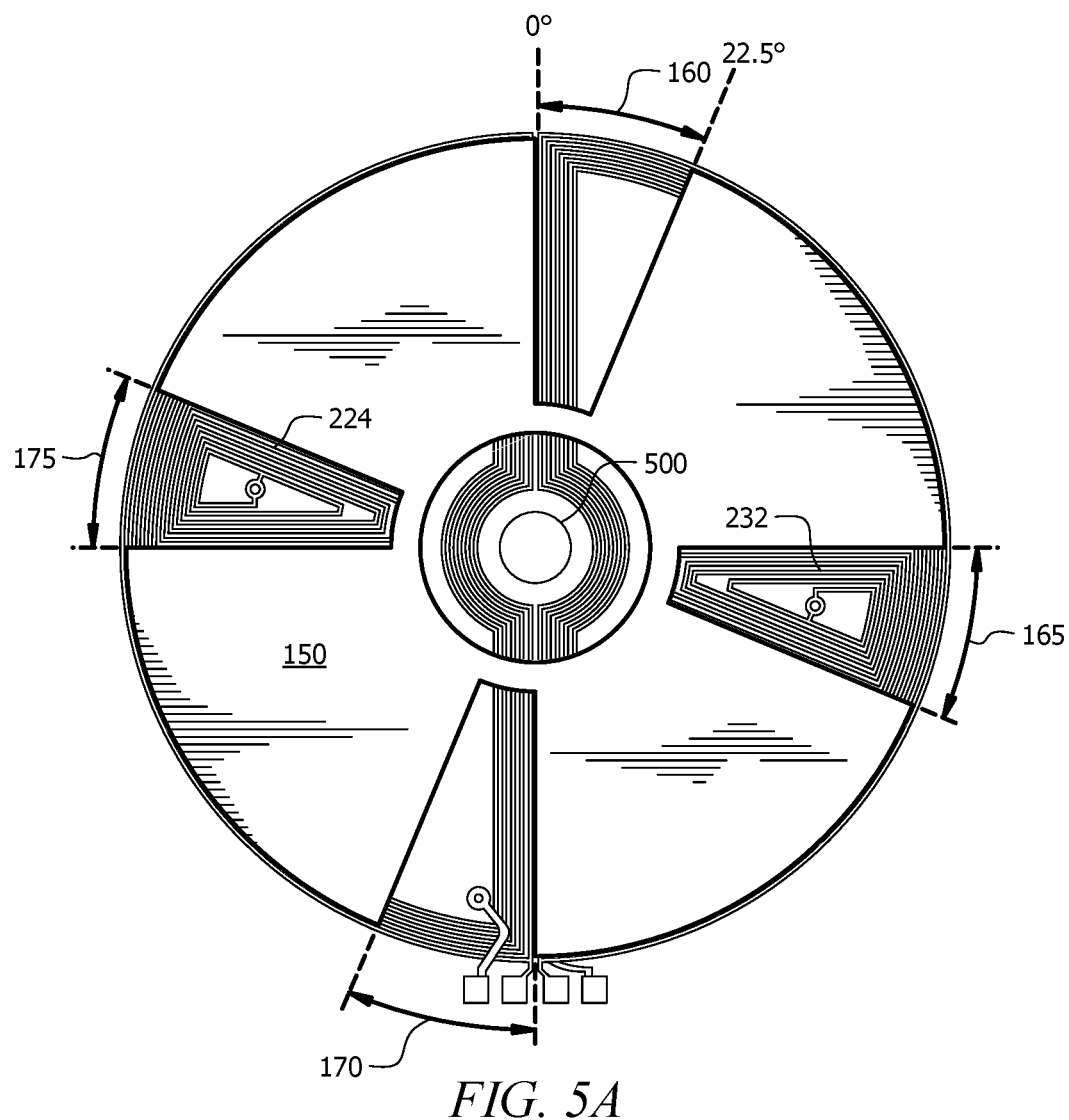
FIG. 5A is a diagram illustrating the angular position sensor in a 0° angular rotation position, in accordance with an embodiment of the present invention.

In FIG. 5A, when the rotatable inductive coupling element 150 is at a 0° position rotation about a center axis 500, a first sector aperture 165 of the rotatable inductive coupling element 150 is positioned over the counter-clockwise winding portion 232 of the third sensing coil 235 of the second angular position sensor 204 (FIG. 2) and a second sector aperture 175 is positioned over the clockwise winding portion 224 of the second sensing coil 221 of the first angular position sensor 202 (FIG. 2). Additionally, the clockwise winding portion 230 of the third sensing coil 235 of the second angular position sensor 204, the counter-clockwise winding portion 226 of the second sensing coil 221 of the first angular position sensor 202, the clockwise winding portion 220 and the counter-clockwise winding portion 222 of the first sensing coil 225 of the first angular position sensor 202, and the clockwise winding portion 234 and the counter-clockwise winding portion 236 of the fourth sensing coil 231 of the second angular position sensor 204 (FIG. 2) are covered by the rotatable inductive coupling element 150.

Figure 5B:
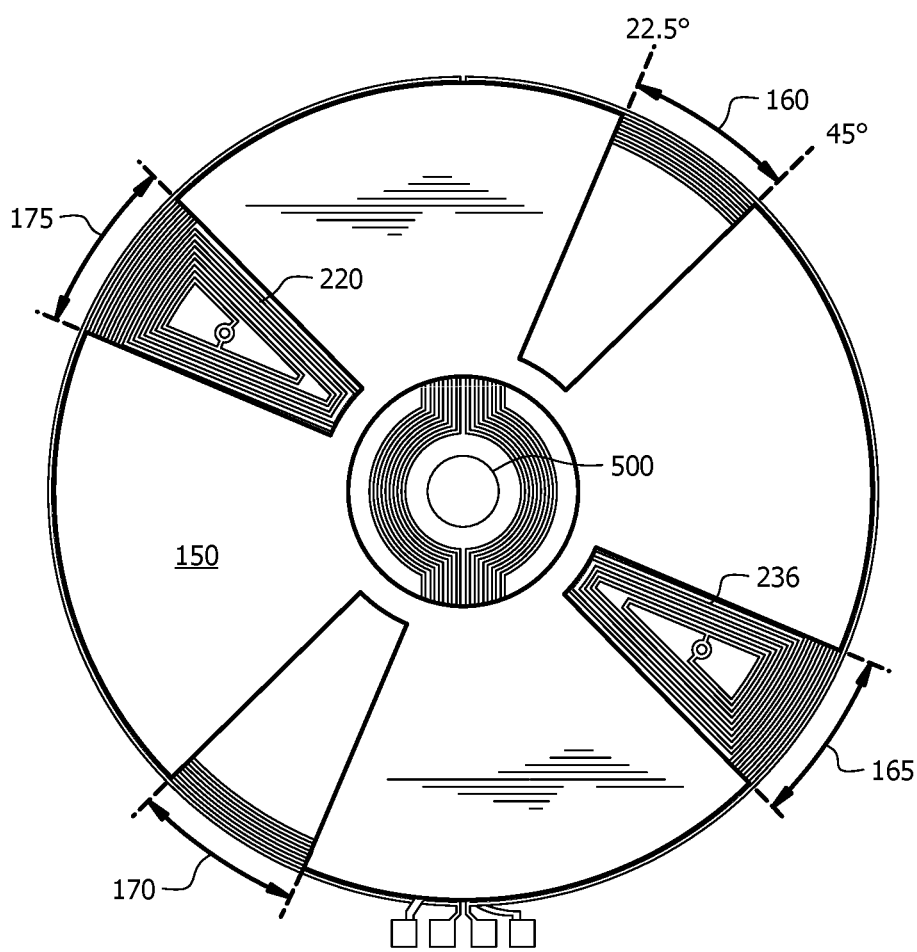
FIG. 5B is a diagram illustrating the angular position sensor in a 22.5° angular rotation position, in accordance with an embodiment of the present invention.

In FIG. 5B, when the rotatable inductive coupling element 150 is rotated about the center axis 500 in a clockwise direction by 22.5° as compared to FIG. 5A, the first sector aperture 165 of the rotatable inductive coupling element 150 is positioned over the counter-clockwise winding portion 236 of the fourth sensing coil 231 of the second angular position sensor 204 (FIG. 2) and the second sector aperture 175 is positioned over the clockwise winding portion 220 of the first sensing coil 225 of the first angular position sensor 202 (FIG. 2). Additionally, the clockwise winding portion 234 of the fourth sensing coil 231 of the second angular position sensor 204, the counter-clockwise winding portion 222 of the first sensing coil 225 of the first angular position sensor 202, the clockwise winding portion 224 and the counter-clockwise winding portion 226 of the second sensing coil 221 of the first angular position sensor 202, and the clockwise winding portion 230 and the counter-clockwise winding portion 232 of the third sensing coil 235 of the second angular position sensor 204 (FIG. 2) are covered by the rotatable inductive coupling element 150.

Figure 5C:
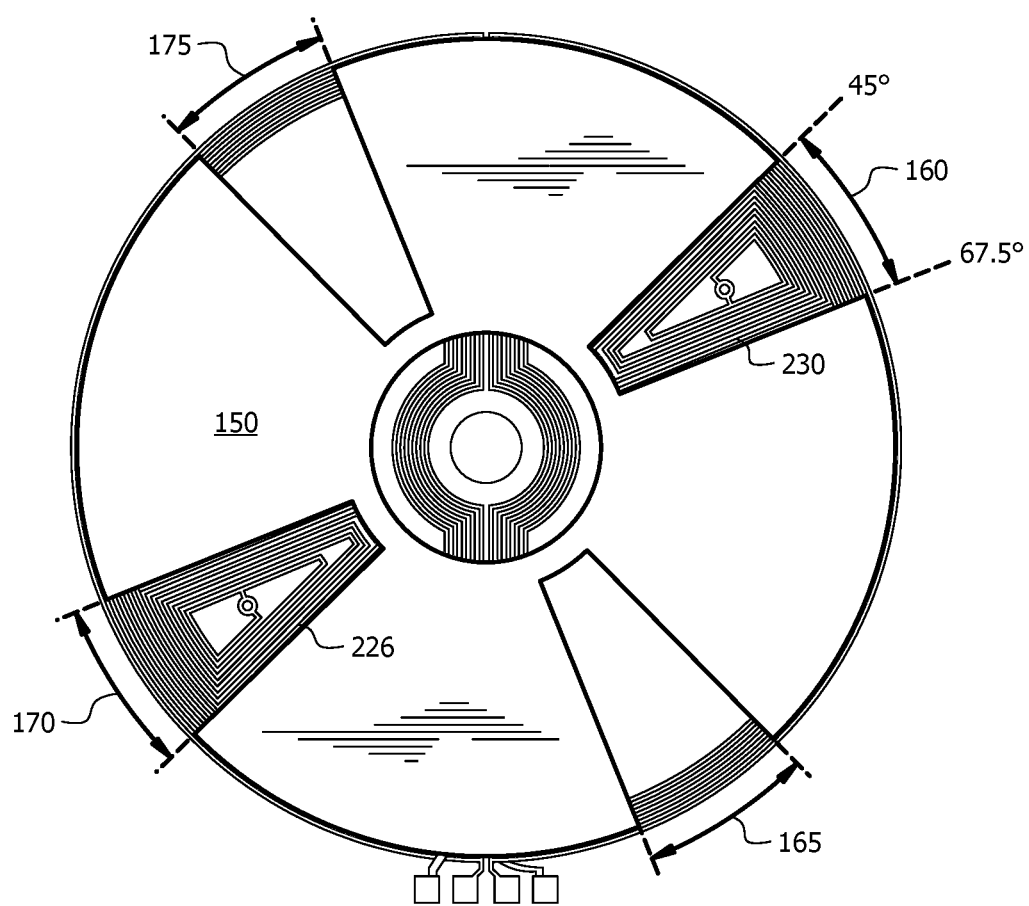
FIG. 5C is a diagram illustrating the angular position sensor in a 45° angular rotation position, in accordance with an embodiment of the present invention.

In FIG. 5C, when the rotatable inductive coupling element 150 is rotated about the center axis 500 in a clockwise direction by another 22.5° as compared to FIG. 5B, a third sector aperture 160 of the rotatable inductive coupling element 150 is positioned over the clockwise winding portion 230 of the third sensing coil 235 of the second angular position sensor 204 (FIG. 2) and a fourth sector aperture 170 is positioned over the counter-clockwise winding portion 226 of the second sensing coil 221 of the first angular position sensor 202 (FIG. 2). Additionally, the counter-clockwise winding portion 232 of the third sensing coil 235 of the second angular position sensor 204, the clockwise winding portion 224 of the second sensing coil 221 of the first angular position sensor 202, the clockwise winding portion 220 and the counter-clockwise winding portion 222 of the first sensing coil 221 of the first angular position sensor 202, and the clockwise winding portion 234 and the counter-clockwise winding portion 236 of the fourth sensing coil 231 of the second angular position sensor 204 (FIG. 2) are covered by the rotatable inductive coupling element 150.

Figure 5D:
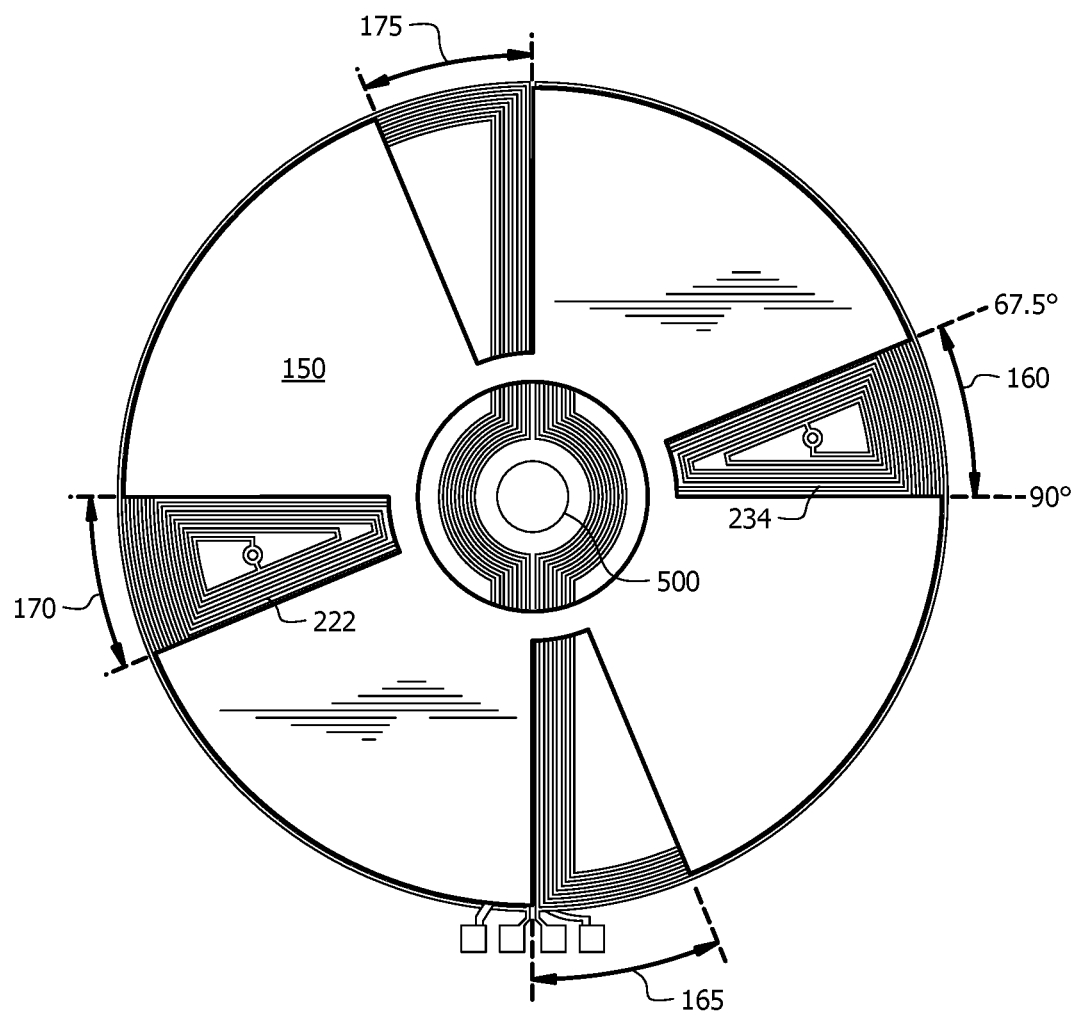
FIG. 5D is a diagram illustrating the angular position sensor in a 67.5° angular rotation position, in accordance with an embodiment of the present invention.

In FIG. 5D, when the rotatable inductive coupling element 150 is rotated about the center axis 500 in a clockwise direction by another 22.5° as compared to FIG. 5C, the third sector aperture 160 of the rotatable inductive coupling element 150 is positioned over the clockwise winding portion 234 of the fourth sensing coil 231 of the second angular position sensor 204 (FIG. 2) and the fourth sector aperture 170 is positioned over the counter-clockwise winding portion 222 of the first sensing coil 225 of the first angular position sensor 202 (FIG. 2). Additionally, the counter-clockwise winding portion 236 of the fourth sensing coil 231 of the second angular position sensor 204, the clockwise winding portion 220 of the first sensing coil 225 of the first angular position sensor 202, the clockwise winding portion 224 and the counter-clockwise winding portion 226 of the second sensing coil 221 of the first angular position sensor 202, and the clockwise winding portion 230 and the counter-clockwise winding portion 232 of the third sensing coil 231 of the second angular position sensor 204 (FIG. 2) are covered by the rotatable inductive coupling element 150.

As the rotatable inductive coupling element 150 is rotated through each of the positions shown in FIG. 5A-FIG. 5D, the time varying voltage induced in the first angular position sensor 202 is measured by the first voltage sensing circuit 260 and the time varying voltage induced in the second angular position sensor 204 is measured by the second voltage sensing circuit 265 (FIG. 2). The voltages measured by the voltage sensing circuits 260, 265 are sine and cosine functions of the angle of rotation of the sector apertures 160, 165, 170, 175 of the rotatable inductive coupling element 150 relative to the angular position sensors 202, 204.

When the sector apertures 165 and 175 are positioned as in FIG. 5A, the time varying magnetic field is attenuated in the clockwise winding portion 230 of the third sensing coil 235 of the second angular position sensor 204, the counter-clockwise winding portion 226 of the second sensing coil 221 of the first angular position sensor 202, the clockwise winding portion 220 and the counter-clockwise winding portion 222 of the first sensing coil 225 of the first angular position sensor 202, and the clockwise winding portion 234 and the counter-clockwise winding portion 236 of the fourth sensing coil 231 of the second angular position sensor 204, but the time varying magnetic field is not attenuated in the counter-clockwise winding portion 232 of the third sensing coil 235 of the second angular position sensor 204 or in the clockwise winding portion 224 of the second sensing coil 221 of the first angular position sensor 202. As such, the time varying voltage induced in winding portions 220 and 222 of the first angular position sensor 202 are the same and the time varying voltage induced in the counter-clockwise winding portion 226 is different than the time varying voltage induced in clockwise winding portion 224 of the first angular position sensor 202 (FIG. 2). Additionally, the time varying voltage induced in winding portions 234 and 236 of the second angular position sensor 204 are the same and the time varying voltage induced in the clockwise winding portion 230 is different than the time varying voltage induced in counter-clockwise winding portion 232 of the second angular position sensor 204. These differences in the induced voltage are measured by the voltage sensing circuits 260, 265, respectively. The first voltage sensing circuit 260 determines a ratio of a magnitude of the measured time varying voltage of the first sensing coil 225 to a magnitude of the measured time varying voltage of the second sensing coil 221 to determine the angular position of the rotatable inductive coupling element 150 relative to the position of the first sensing coil 225 and the second sensing coil 221. Additionally, the second voltage sensing circuit 265 determines a ratio of a magnitude of the measured time varying voltage of the third sensing coil 235 to a magnitude of the measured time varying voltage of the fourth sensing coil 231 to determine the angular position of the rotatable inductive coupling element 150 relative to the position of the third sensing coil 235 and the fourth sensing coil 231. The above has been described in some detail in relation to the sector apertures 165, 175 positioned as in FIG. 5A, it being understood that similar changes in time varying voltage can be described for the positioning of the sector apertures as shown in each of FIGS. 5B-5D.

Figure 6:
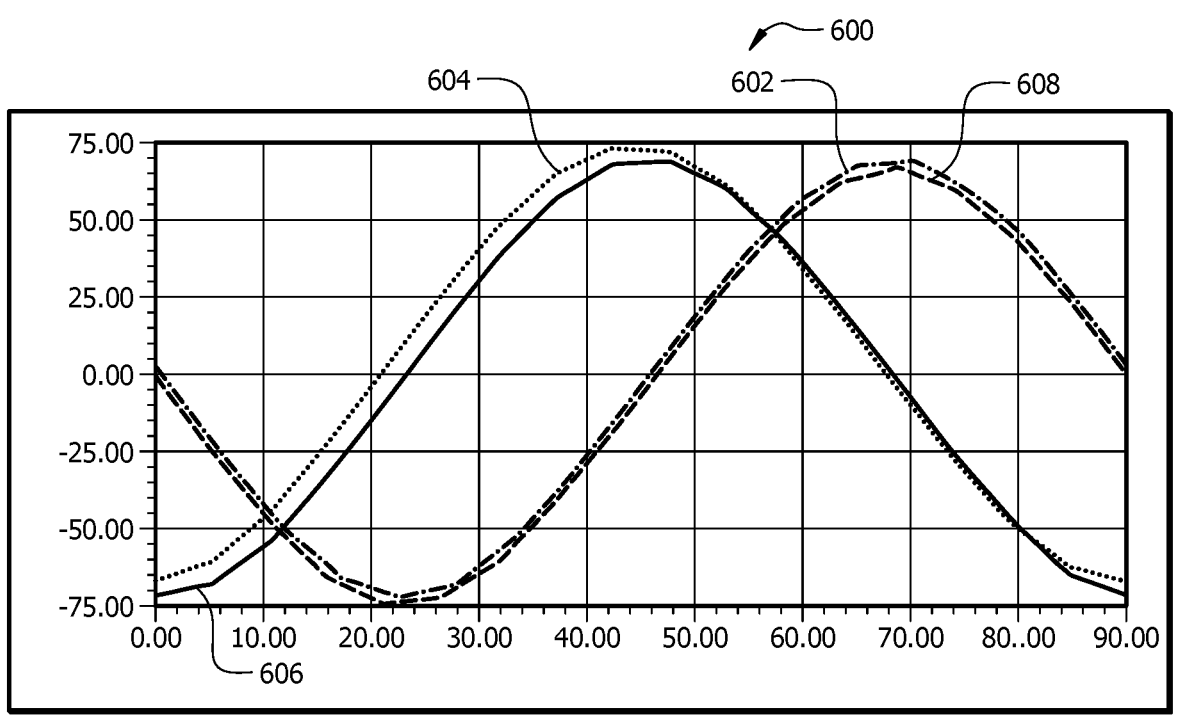
FIG. 6 is a graphical illustration of the voltage magnitude variation of the sensing coils with respect to position of the rotatable inductive coupling element, in accordance with an embodiment of the present invention

FIG. 6 illustrates a graph of the net voltage (y-axis) induced in the sensing coils 221, 225 relative to the angular position (x-axis) of the rotatable coupling element 150. As shown in the graph 600 of FIG. 6, with the position of the first sector aperture 165, as shown in FIG. 5A considered as the zero-rotation reference point, the net voltage 602 induced in the clockwise winding portion 220 and the counter-clockwise winding portion 222 of the first sensing coil 225 is zero because both of the winding portions 220, 222 of the first sensing coil 225 are covered by the rotatable inductive coupling element 150. However, the net voltage 604 induced in the second sensing coil 221 is at a negative peak value because the clockwise winding portion 224 of the second sensing coil 221 is not covered at all by the rotatable inductive coupling element 150 and the counter-clockwise winding portion 226 is completely covered by the rotatable inductive coupling element 150. Additionally, with the position of the second sector aperture 175, as shown in FIG. 5A considered as the zero-rotation reference point, the net voltage 608 induced in the clockwise winding portion 234 and the counter-clockwise winding portion 236 of the fourth sensing coil 231 is zero because both of the winding portions 234, 236 of the fourth sensing coil 231 are covered by the rotatable inductive coupling element 150. However, the net voltage 606 induced in the third sensing coil 235 is at a negative peak value because the counter-clockwise winding portion 232 of the third sensing coil 235 is not covered at all by the rotatable inductive coupling element 150 and the clockwise winding portion 230 is completely covered by the rotatable inductive coupling element 150.

The peak value of the sine and cosine functions of the time varying voltage of the sensing coils 221, 225, 231, 235 is dependent upon the gap 180 between the winding portions of the sensing coils 221, 225, 231, 235 and the rotatable inductive coupling element 150 and the number of winding turns of the two excitation coils 105, 110.

The graph 600 of FIG. 6 assumes that both the first angular position sensor 202 and the second angular position sensor 204 are both operational, i.e. not short-circuited or open-circuited. In general, the graph 600 of FIG. 6 illustrates the voltage magnitude variation of the first sensing coil 225 and the second sensing coil 221 with respect to the position of the sector apertures 170, 175 of the rotatable inductive coupling element 150 and the voltage magnitude variation of the third sensing coil 235 and the fourth sensing coil 231 with respect to the position of the sector apertures 160, 165. The voltage magnitude variation of the first sensing coil 225 and the second sensing 221 is sensed by the first voltage sensing circuit 260 and the voltage magnitude variation of the third sensing coil 235 and the fourth sensing coil 231 is sensed by the second voltage sensing circuit 265. The measurements may be further processed to provide the target angular position. For example, if the magnitude of the voltage 604 of the first sensing coil 225 is measured by the first voltage sensing circuit 260 as a zero voltage and the magnitude of the voltage 602 of the second sensing coil 221 is measured as a negative peak voltage, in can be determined from a comparison of the measured voltages that the angular position of the rotatable inductive coupling element 150 is at 22.5°, which is equivalent to the configuration illustrated in FIG. 5B. Additionally, if the magnitude of the voltage 606 of the third sensing coil 235 is measured by the second voltage sensing circuit 265 as a zero voltage and the magnitude of the voltage of the fourth sensing coil 231 is measured as a negative peak voltage, it can also be determined from a comparison of the measure voltages that the angular position of the rotatable inductive coupling element 150 is at 22.5°, which also equivalent to the configuration illustrated in FIG. 5B.

Accordingly, with both angular position sensors 202, 204 in operation, either of the sensors 202, 204 can be used to determine the angular position of the rotatable inductive coupling element 150. It follows that, if one of the angular position sensors 202, 204 enters into a fault condition, the other sensor will continue to operate to determine the angular position of the rotatable inductive coupling element 150.

The graph 600 illustrates the voltage magnitude of the sensing coils 221, 225, 231, 235 between the 0°, 22.5°, 45°, 67.5° and 90° positions of the rotatable inductive coupling element 150. Between 0°, 22.5°, 45°, 67.5° and 90° positions of the rotatable inductive coupling element 150, one or more of the winding portions of the sensing coils 221, 225, 231, 235 may only be partially covered by one of the sector apertures 160, 165, 170, 175 of the rotatable inductive coupling element 150, thereby resulting in sensed voltage magnitudes between the maximum and minimum magnitudes, as shown.

FIG. 7 illustrates a flow diagram of a method 700 for redundant sensing of the angular position of a rotatable inductive coupling element, in accordance with an embodiment of the present invention.

At operation 705 of FIG. 7, the method includes establishing a magnetic coupling between a first excitation coil, a first sensing coil and a second sensing coil of a first angular position sensor to induce a time varying voltage in the first sensing coil and the second sensing coil, wherein the first excitation coil forms a first semicircular area of the first angular position sensor and further defines a first interior area thereof, wherein the first interior area is distal of the first excitation coil in relation to the center axis, i.e. in relation to the axis of rotation of the rotatable inductive coupling element, and the first sensing coil and the second sensing coil are positioned within the first interior area and wherein each of the first sensing coil and the second sensing coil comprises a respective clockwise winding portion and a respective counter-clockwise winding portion. With reference to FIG. 2, a magnetic coupling is established between a first excitation coil 105, a first sensing coil 225 and a second sensing coil 221 of a first angular position sensor 202 to induce a time varying voltage in the first sensing coil 225 and the second sensing coil 221.

At operation 710, the method also includes, establishing a magnetic coupling between a second excitation coil and a third sensing coil and a fourth sensing coil of a second angular position sensor to induce a time varying voltage in the third sensing coil and the fourth sensing coil, wherein the second excitation coil forms a second semicircular area and further defines a second interior area thereof, wherein the second interior area is distal of the second excitation coil in relation to the center axis, i.e. in relation to the axis of rotation of the rotatable inductive coupling element, and the third sensing coil and the fourth sensing coil are positioned within the second interior area, wherein each of the third sensing coil and the fourth sensing coil comprises a respective clockwise winding portion and a respective counter-clockwise winding portion. With reference to FIG. 2, a magnetic coupling is established between a second excitation coil 110, a third sensing coil 235 and a fourth sensing coil 231 of a second angular position sensor 204 to induce a time varying voltage in the third sensing coil 235 and the fourth sensing coil 231.

At operation 715, the method continues by rotating a rotatable inductive coupling element comprising four sector apertures that are substantially evenly radially spaced about the rotatable inductive coupling element, the rotatable inductive coupling element in overlying relation to the first sensing coil, the second sensing coil, the third sensing coil and the fourth sensing coil and separated from the first sensing coil, the second sensing coil, the third sensing coil and the fourth sensing coil by a gap, the rotational position of the sector apertures of the rotatable inductive coupling element to cause a variation in the magnetic coupling between the first excitation coil and the first sensing coil and the second sensing coil and to cause a variation in the magnetic coupling between the second excitation coil and the third sensing coil and the fourth sensing coil responsive to rotation of the rotatable inductive coupling element. With reference to FIG. 1 and FIG. 2, a rotating inductive coupling element 150 having four sector apertures 160, 165, 170, 175 substantially event radially spaced about the rotatable inductive coupling element 150 is positioned in overlying relation to the first sensing coil 225, the second sensing coil 221, the third sensing coil 235 and the fourth sensing coil 231. As shown in FIG. 5A-FIG. 5D, the rotatable inductive coupling element 150 is rotated about an axis 500 to cause a variation in the magnetic coupling between the first excitation coil 105 the first sensing coil 225 and the second sensing coil 221 and to cause a variation in the magnetic coupling between the second excitation coil 110 and the third sensing coil 235 and the fourth sensing coil 231 responsive to rotation of the rotatable inductive coupling element 150.

At operation 720, the method continues by measuring a time varying voltage induced in the first sensing coil and the second sensing coil as a result of the variation in the magnetic coupling and determining an angular position of the rotatable inductive coupling element relative to the position of the first sensing coil and the second sensing coil. With reference to FIG. 2, the first voltage sensing circuit 260 receives modulated cosine signals from the first sensing coil 225 and modulated sine signals from the second sensing coil 221, in the presence of the rotatable inductive couple element 150.

At operation 725, the method continues by measuring a time varying voltage induced in the third sensing coil and the fourth sensing coil as a result of the variation in the magnetic coupling and determining an angular position of the rotatable inductive coupling element relative to the position of the third sensing coil and the fourth sensing coil. With reference to FIG. 2, the second voltage sensing circuit 265 receives modulated cosine signals from the third sensing coil 235 and modulated sine signals from the fourth sensing coil 231, in the presence of the rotatable inductive couple element 150. The second voltage sensing circuit 265 then demodulates the received signals and calculates position information by performing an arctangent calculation of the ratio of the cosine and sine signals.

Figure 8:
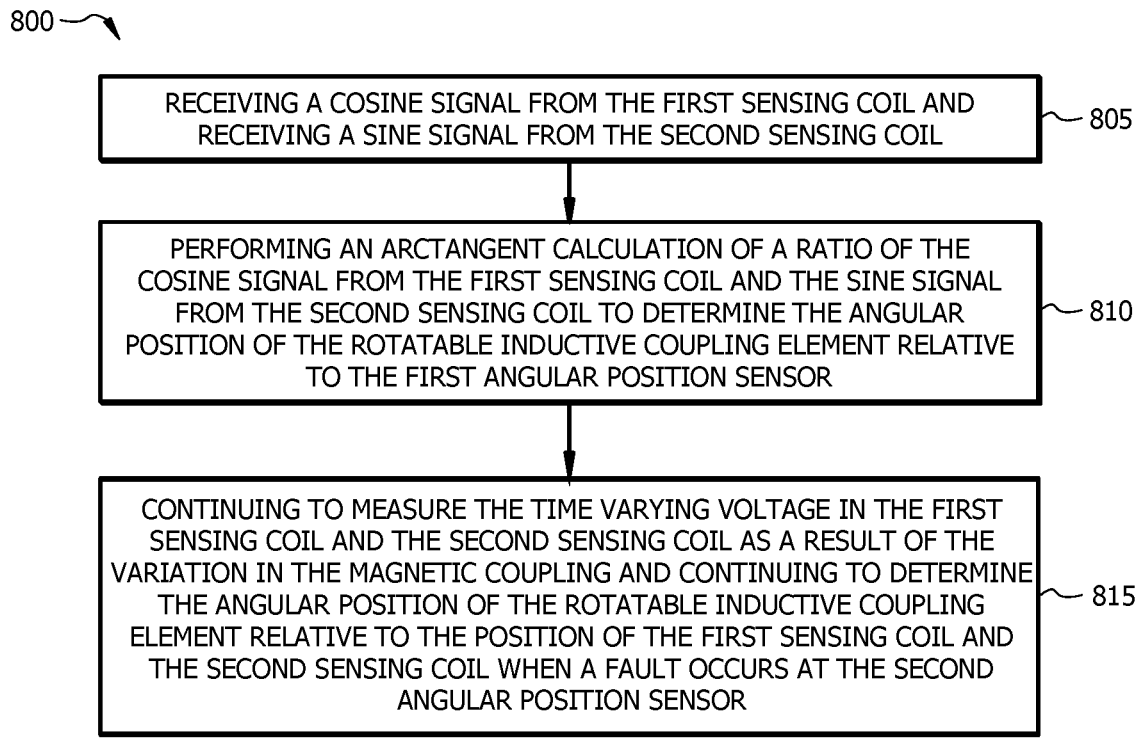
FIG. 8 is a flow diagram illustrating a method for determining an angular position of a rotatable inductive coupling element using a first angular position sensor of a redundant angular position sensor.

FIG. 8 is a flow diagram illustrating a method for determining an angular position of a rotatable inductive coupling element using a first angular position sensor of a redundant angular position sensor.

At operation 805 of FIG. 8, the method includes receiving a cosine signal from the first sensing coil and a sine signal from the second sensing coil.

At operation 810, the method continues by performing an arctangent calculation of a ratio of the cosine signal from the first sensing coil and the sine signal from the second sensing coil to determine the angular position of the rotatable inductive coupling element relative to the first angular position sensor. With reference to FIG. 2 and FIG. 6, the first voltage sensing circuit 260 receives a cosine signal 602 from the first sensing coil 225 and a sine signal 604 from the second sensing coil 221 and calculates position information of the rotatable inductive coupling element 150 relative to the first angular position sensor 202 by performing an arctangent calculation of the ratio of the cosine 602 and sine 604 signals.

At operation 815, the method proceeds by continuing to measure the time varying voltage in the first sensing coil and the second sensing coil as a result of the variation in the magnetic coupling and continuing to determine the angular position of the rotatable inductive coupling element relative to the position of the first sensing coil and the second sensing coil when a fault occurs at the second angular position sensor. With reference to FIG. 2, the first voltage sensing circuit 260 continues to measure the time varying voltage in the first sensing coil 225 and the second sensing 221 coil when a fault occurs at the second angular position sensor 204.

Figure 9:
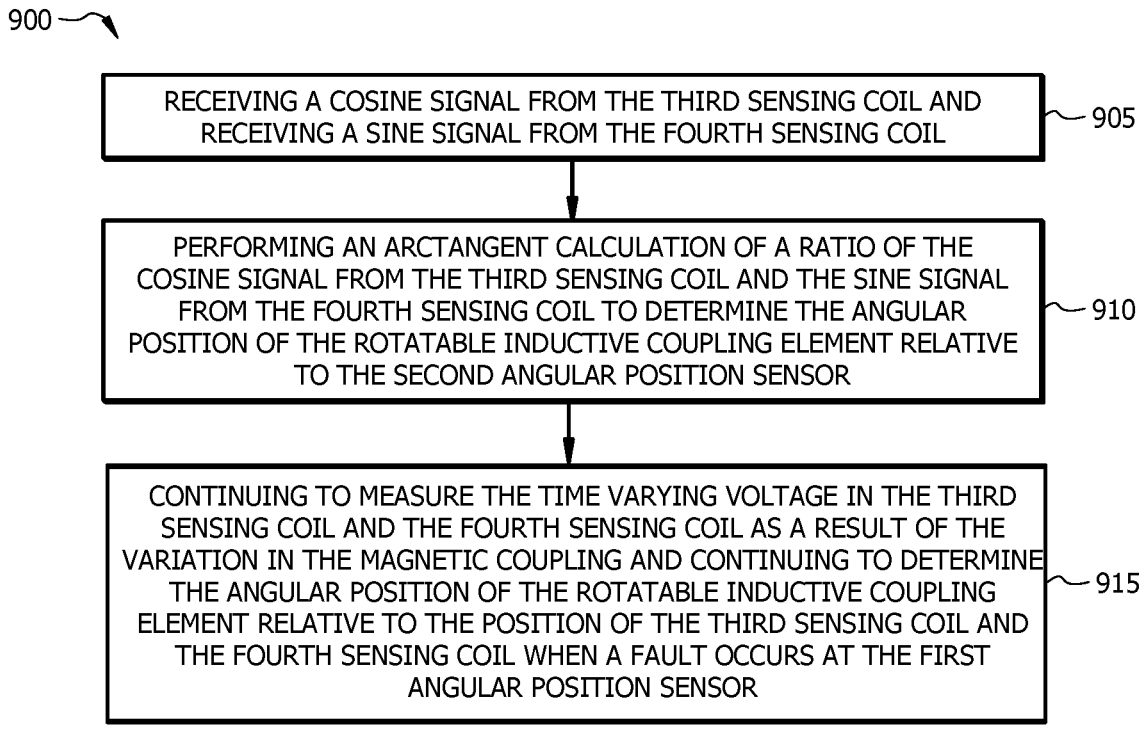
FIG. 9 is a flow diagram illustrating a method for determining an angular position of a rotatable inductive coupling element using a second angular position sensor of a redundant angular position sensor.

FIG. 9 is a flow diagram illustrating a method for determining an angular position of a rotatable inductive coupling element using a second angular position sensor of a redundant angular position sensor.

At operation 905 of FIG. 9, the method includes receiving a cosine signal from the third sensing coil and a sine signal from the fourth sensing coil.

At operation 910, the method continues by performing an arctangent calculation of a ratio of the cosine signal from the third sensing coil and the sine signal from the fourth sensing coil to determine the angular position of the rotatable inductive coupling element relative to the second angular position sensor. With reference to FIG. 2 and FIG. 6, the second voltage sensing circuit 265 receives a cosine signal 606 from the third sensing coil 235 and a sine signal 608 from the fourth sensing coil 231 and calculates position information of the rotatable inductive coupling element 150 relative to the second angular position sensor 204 by performing an arctangent calculation of the ratio of the cosine 606 and sine 608 signals.

At operation 915, the method proceeds by continuing to measure the time varying voltage induced in the third sensing coil and the fourth sensing coil as a result of the variation in the magnetic coupling and continuing to determine the angular position of the rotatable inductive coupling element relative to the position of the third sensing coil and the fourth sensing coil when a fault occurs at the first angular position sensor. With reference to FIG. 2, the second voltage sensing circuit 265 continues to measure the time varying voltage in the third sensing coil 235 and the fourth sensing 231 coil when a fault occurs at the first angular position sensor 202.

The above has been described in an embodiment where the excitation coils are radially further extended than the sensing coils, i.e., each of the first and second excitation coils are distal of the associated sensing coils when viewed from the axis of rotation of the rotatable inductive coupling element, however this is not meant to be limiting in any way. In another embodiment (not shown), the first and second sensing coils are radially further extended than the first excitation coil and the first and second sensing coils form a first semicircular area defining a first interior area, with the first excitation coil formed in the interior area of the first semicircular area. Similarly, the third and fourth sensing coils are radially further extended than the second excitation coil and the third and fourth sensing coils form a second semicircular area defining a second interior area, with the second excitation coil formed in the interior area of the second semicircular area. In this embodiment, each of the excitation coils are proximal of the associated sensing coils when viewed from the longitudinal rotation axis, which proximal embodiment may require an increase in current for the excitation coils as compared with the above distal embodiment.

In one embodiment, portions of the redundant angular position sensor may be implemented in an integrated circuit as a single semiconductor die. Alternatively, the integrated circuit may include multiple semiconductor die that are electrically coupled together such as, for example, a multi-chip module that is packaged in a single integrated circuit package.

The system and method of the present invention provides an improved, non-contact, inductive, which provided redundancy measurements utilizing a coil assembly that can be implemented on a two-layer printed circuit board (PCB).

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, microcontroller or general-purpose computer.

Unless specifically stated otherwise as apparent from the discussion, it is appreciated that throughout the description, discussions utilizing terms such as "measuring", "determining", "generating", "applying", "sending", "encoding", "locking", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. A redundant angular position sensor comprising:
    a first angular position sensor comprising;
        a first excitation coil forming a first semicircular area defining a first interior area;
        a first sensing coil and a second sensing coil positioned within the first interior area, respective ones of the first and second sensing coils comprising a respective clockwise winding portion and a respective counter-clockwise winding portion, wherein respective ones of the respective clockwise winding portions and the respective counter-clockwise winding portions of the first sensing coil and the second sensing coil are alternately positioned within a respective one of four equal sectors of the first interior area;
    a second angular position sensor, wherein the second angular position sensor is positioned adjacent to the first angular position sensor, the second angular position sensor comprising;
        a second excitation coil;
        a third sensing coil and a fourth sensing coil, respective ones of the third and fourth sensing coils comprising a respective clockwise winding portion and a respective counter-clockwise winding portion; and
    a rotatable inductive coupling element positioned in overlying relation to, and separated by a gap from, the first sensing coil, the second sensing coil, the third sensing coil and the fourth sensing coil, wherein the rotatable inductive coupling element comprises four sector apertures that are substantially evenly radially spaced about the rotatable inductive coupling element.

2. The redundant angular position sensor of claim 1, wherein the second excitation coil forms a second semicircular area defining a second interior area and wherein the third sensing coil and the fourth sensing coil are positioned within the second interior area.

3. The redundant angular position sensor of claim 2, wherein respective ones of the respective clockwise winding portions and the respective counter-clockwise winding portions of the third sensing coil and the fourth sensing coil are alternately positioned within a respective one of four equal sectors of the second interior area.

4. The redundant angular position sensor of claim 1, wherein the first angular position sensor further comprises a first voltage supply and a first ground node and the second angular position sensor further comprises a second voltage supply, that is independent of the first voltage supply, and a second ground node that is independent of the first ground node.

5. The redundant angular position sensor of claim 1, wherein respective ones of the first excitation coil and the second excitation coil comprise a respective clockwise winding portion and a respective counter-clockwise winding portion.

6. The redundant angular position sensor of claim 1, wherein respective ones of the four equal sectors are 22.5° sectors.

7. The redundant angular position sensor of claim 1, wherein respective ones of the four equal sectors are 22.5°.

8. The redundant angular position sensor of claim 1, wherein the four sector apertures comprise approximately 25% of the area of the rotatable inductive coupling element.

9. The redundant angular position sensor of claim 1, wherein approximately 75% of the area of the rotatable inductive coupling element is comprised of a non-ferromagnetic conductive material.

10. The redundant angular position sensor of claim 1, further comprising:
    a first voltage sensing circuit coupled to the first sensing coil and the second sensing coil; and
    a second voltage sensing circuit coupled to the third sensing coil and the fourth sensing coil.

11. A redundant angular position sensor comprising:
    a first angular position sensor comprising;
        a first excitation coil, having a clockwise winding portion and a counter-clockwise winding portion, wherein the first excitation coil forms a first semicircular area defining a first interior area;
        a first sensing coil and a second sensing coil positioned within the first interior area defined by the first excitation coil, respective ones of the first sensing coil and the second sensing coil comprising a respective clockwise winding portion and a respective counter-clockwise winding portion and respective ones of the respective clockwise winding portion and the respective counter-clockwise winding portion of the first sensing coil and the second sensing coil alternately positioned within one of four 22.5° sectors forming a 90° sector of the first interior area;
a first voltage supply and a first ground node coupled to the first excitation coil;
a second angular position sensor comprising;
a second excitation coil, having a clockwise winding portion and a counter-clockwise winding portion, wherein the second excitation coil forms a second semicircular area defining a second interior area and wherein a diameter of the second semicircular area formed by the second excitation coil is positioned adjacent to a diameter of the first semicircular area formed by the first excitation coil;
a third sensing coil and a fourth sensing coils positioned within the second interior area, respective ones of the third sensing coil and the fourth sensing coil comprising a respective clockwise winding portion and a respective counter-clockwise winding portion and respective ones of the respective clockwise winding portion and the respective counter-clockwise winding portion of the third sensing coil and the fourth sensing coil alternately positioned within one of four 22.5° sectors forming a 90° sector of the second interior area;
a second voltage supply coupled to the second excitation coil that is independent of the first voltage supply and a second ground node coupled to the second excitation coil that is independent of the first ground node; and
a rotatable inductive coupling element positioned in overlying relation to and separated by a gap from, the first sensing coil, the second sensing coil, the third sensing coil and the fourth sensing coil, wherein the rotatable inductive coupling element comprises four 22.5° sector apertures that are substantially evenly radially spaced about the rotatable inductive coupling element.

12. A method for redundantly sensing an angular position of a rotatable inductive coupling element, the method comprising:
establishing a magnetic coupling between a first excitation coil, a first sensing coil and a second sensing coil of a first angular position sensor to induce a time varying voltage in the first sensing coil and the second sensing coil, wherein the first excitation coil forms a first semicircular area defining a first interior area and wherein the first sensing coil and the second sensing coil are positioned within the first interior area, wherein respective ones of the first sensing coil and the second sensing coil comprises a respective clockwise winding portion and a respective counter-clockwise winding portion and wherein respective ones of the respective clockwise winding portions and the respective counter-clockwise winding portions of the first sensing coil and the second sensing coil are alternately positioned within a respective one of four equal sectors of the first interior area;
establishing a magnetic coupling between a second excitation coil and a third sensing coil and a fourth sensing coil of a second angular position sensor to induce a time varying voltage in the third sensing coil and the fourth sensing coil, wherein respective ones of the third sensing coil and the fourth sensing coil comprises a respective clockwise winding portion and a respective counter-clockwise winding portion;
rotating a rotatable inductive coupling element comprising four sector apertures that are substantially evenly radially spaced about the rotatable inductive coupling element, the rotatable inductive coupling element in overlying relation to the first sensing coil, the second sensing coil, the third sensing coil and the fourth sensing coil and separated from the first sensing coil, the second sensing coil, the third sensing coil and the fourth sensing coil by a gap, the rotational position of the sector apertures of the rotatable inductive coupling element to cause a variation in the magnetic coupling between the first excitation coil, the first sensing coil and the second sensing coil and to cause a variation in the magnetic coupling between the second excitation coil, the third sensing coil and the fourth sensing coil responsive to rotation of the rotatable inductive coupling element;
measuring a time varying voltage induced in the first sensing coil and the second sensing coil as a result of the variation in the magnetic coupling;
determining an angular position of the rotatable inductive coupling element relative to the position of the first sensing coil and the second sensing coil;
measuring a time varying voltage induced in the third sensing coil and the fourth sensing coil as a result of the variation in the magnetic coupling; and
determining an angular position of the rotatable inductive coupling element relative to the position of the third sensing coil and the fourth sensing coil.

13. The method of claim 12, wherein the second excitation coil forms a second semicircular area defining a second interior area of the second angular position sensor and where the third sensing coil and the fourth sensing coil are positioned within the second interior area.

14. The method of claim 12, wherein said rotating the rotatable inductive coupling element is to at least partially position a first one of the sector apertures over at least one of the respective clockwise or counter-clockwise winding portions of the first sensing coil or the second sensing coil to cause the variation in the magnetic coupling between the first excitation coil and the first sensing coil or the second sensing coil and to at least partially position a second one of the sector apertures over at least one of the respective clockwise or counter-clockwise winding portions of the third sensing coil or the third sensing coil to cause the variation in the magnetic coupling between the second excitation coil and the third sensing coil or the second sensing coil.

15. The method of claim 12, wherein measuring the time varying voltage induced in the first sensing coil and the second sensing coil as a result of the variation in the magnetic coupling and determining an angular position of the rotatable inductive coupling element relative to the position of the first sensing coil and the second sensing coil further comprises:
receiving a cosine signal from the first sensing coil and receiving a sine signal from the second sensing coil; and
performing an arctangent calculation of a ratio of the cosine signal from the first sensing coil and the sine signal from the second sensing coil to determine the angular position of the rotatable inductive coupling element relative to the first angular position sensor.

16. The method of claim 12, wherein measuring the time varying voltage induced in the third sensing coil and the fourth sensing coil as a result of the variation in the magnetic coupling and determining an angular position of the rotatable inductive coupling element relative to the position of the third sensing coil and the fourth sensing coil further comprises:

receiving a cosine signal from the third sensing coil and receiving a sine signal from the fourth sensing coil; and performing an arctangent calculation of a ratio of the cosine signal from the third sensing coil and the sine signal from the fourth sensing coil to determine the angular position of the rotatable inductive coupling element relative to the second angular position sensor.

17. The method of claim 12, further comprising: providing a first voltage supply and a first ground node for the first angular position sensor and a second voltage supply and a second ground node for the second angular position sensor, wherein the second voltage supply is independent of the first voltage supply and the second ground node is independent of the first ground node.

18. The method of claim 12, further comprising:
continuing to measure the time varying voltage in the first sensing coil and the second sensing coil as a result of the variation in the magnetic coupling and continuing to determine the angular position of the rotatable inductive coupling element relative to the position of the first sensing coil and the second sensing coil when a fault occurs at the second angular position sensor.

19. The method of claim 12, further comprising:
continuing to measure the time varying voltage induced in the third sensing coil and the fourth sensing coil as a result of the variation in the magnetic coupling and continuing to determine the angular position of the rotatable inductive coupling element relative to the position of the third sensing coil and the fourth sensing coil when a fault occurs at the first angular position sensor.

20. The method of claim 12, wherein respective ones of the sector apertures of the rotatable inductive coupling element are dimensioned to substantially cover one of the respective clockwise winding portions or the respective counter-clockwise winding portions of the first sensing coil, the second sensing coil, the third sensing coil and the fourth sensing coil.

* * * * *

UNITED STATES PATENT AND TRADEMARK OFFICE
CERTIFICATE OF CORRECTION

PATENT NO. : 11,656,101 B2
APPLICATION NO. : 17/146875
DATED : May 23, 2023
INVENTOR(S) : Ganesh Shaga Page 1 of 1

It is certified that error appears in the above-identified patent and that said Letters Patent is hereby corrected as shown below:

In the Claims

Column 22, Line 47, replace "or the third sensing" with --or the fourth sensing--.
Column 22, Line 49, replace "or the second" with --or the fourth--.

Signed and Sealed this
Twenty-first Day of January, 2025

Coke Morgan Stewart
*Acting Director of the United States Patent and Trademark Office*